United States Patent
Miyazawa

(10) Patent No.: US 11,645,744 B2
(45) Date of Patent: May 9, 2023

(54) INSPECTION DEVICE AND INSPECTION METHOD

(71) Applicant: MITSUBISHI ELECTRIC CORPORATION, Tokyo (JP)

(72) Inventor: Kazuyuki Miyazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 608 days.

(21) Appl. No.: 16/343,306

(22) PCT Filed: Dec. 6, 2016

(86) PCT No.: PCT/JP2016/086138
§ 371 (c)(1),
(2) Date: Apr. 18, 2019

(87) PCT Pub. No.: WO2018/105028
PCT Pub. Date: Jun. 14, 2018

(65) Prior Publication Data
US 2021/0295485 A1      Sep. 23, 2021

(51) Int. Cl.
*G06T 7/00*     (2017.01)
*G06T 7/33*     (2017.01)
(Continued)

(52) U.S. Cl.
CPC ............. *G06T 7/001* (2013.01); *G06T 5/001* (2013.01); *G06T 5/20* (2013.01); *G06T 7/337* (2017.01);
(Continued)

(58) Field of Classification Search
CPC ................. G06K 9/6262; G06K 9/62; G06T 2207/20084; G06T 2207/20081; G06T 7/0004; G06T 2207/30164; G06T 7/001
See application file for complete search history.

(56) References Cited

U.S. PATENT DOCUMENTS

| | | | |
|---|---|---|---|
| 7,379,580 B2 * | 5/2008 | Levin | G06T 7/0002 348/125 |
| 2002/0172412 A1 * | 11/2002 | Jun | G06T 5/008 382/149 |

(Continued)

FOREIGN PATENT DOCUMENTS

| | | |
|---|---|---|
| CN | 102881029 A | 1/2013 |
| CN | 105426902 A | 3/2016 |

(Continued)

OTHER PUBLICATIONS

German Office Action for German Application No. 112016007498.0, dated Mar. 3, 2020, with partial English translation.

(Continued)

*Primary Examiner* — Guillermo M Rivera-Martinez
(74) *Attorney, Agent, or Firm* — Birch, Stewart, Kolasch & Birch, LLP

(57) ABSTRACT

An inspection device includes: an analyzer to calculate a parameter representing a feature of image data of an object having no defect by performing dimensionality reduction on the image data, and perform dimensionality reduction on image data of an object to be inspected by using the parameter; a restorer to generate restored data obtained by restoring the image data of the object to be inspected subjected to the dimensionality reduction; a corrector to filter the restored data by using a filter for correcting an error between the restored data and the image data of the object to be inspected, thereby generating corrected restored data; a determiner to output a determination result indicating whether the object to be inspected is defective, based on a difference of each pixel between the image data of the object to be inspected and the corrected restored data; and an interface to output the determination result.

12 Claims, 15 Drawing Sheets

(51) Int. Cl.
  *G06T 5/00*   (2006.01)
  *G06T 5/20*   (2006.01)
  *G06T 9/00*   (2006.01)
  *G06T 19/00*  (2011.01)

(52) U.S. Cl.
  CPC .......... *G06T 9/002* (2013.01); *G06T 19/006* (2013.01); *G06T 2200/24* (2013.01); *G06T 2207/20212* (2013.01); *G06T 2210/12* (2013.01)

(56) References Cited

U.S. PATENT DOCUMENTS

| | | | |
|---|---|---|---|
| 2003/0050761 A1* | 3/2003 | Okabe | G01N 21/95607 702/82 |
| 2005/0110988 A1 | 5/2005 | Nishiyama et al. | |
| 2006/0290930 A1* | 12/2006 | Nishiyama | G01N 21/95623 356/338 |
| 2007/0288219 A1* | 12/2007 | Zafar | G06T 7/0008 703/14 |
| 2011/0158542 A1 | 6/2011 | Kato et al. | |
| 2011/0188734 A1* | 8/2011 | Tsuchiya | G06T 7/0002 382/149 |
| 2012/0051629 A1 | 3/2012 | Ueki et al. | |
| 2012/0134579 A1* | 5/2012 | Kameyama | G06T 3/4053 382/159 |
| 2015/0036915 A1* | 2/2015 | Siahkali | G01N 21/95607 382/149 |
| 2016/0117812 A1* | 4/2016 | Pandev | G06K 9/4604 382/149 |
| 2016/0290934 A1* | 10/2016 | Wells | G06T 7/0008 |
| 2016/0305893 A1* | 10/2016 | Shibata | G01N 21/956 |
| 2017/0191945 A1* | 7/2017 | Zhang | G01N 21/9501 |
| 2017/0191948 A1* | 7/2017 | Gao | G06T 7/001 |
| 2017/0351952 A1* | 12/2017 | Zhang | G06N 3/0454 |
| 2018/0019097 A1* | 1/2018 | Harada | H01J 37/244 |
| 2018/0196911 A1* | 7/2018 | Chang | G06T 7/0004 |

FOREIGN PATENT DOCUMENTS

| | | |
|---|---|---|
| DE | 10221318 A1 | 11/2002 |
| DE | 102012101242 A1 | 8/2013 |
| JP | 6-281592 A | 10/1994 |
| JP | 2000-346627 A | 12/2000 |
| JP | 2006-145484 A | 6/2006 |
| JP | 2006-322766 A | 11/2006 |
| JP | 2009-32273 A | 2/2009 |
| JP | 2011-138388 A | 7/2011 |
| JP | 2013-32995 A | 2/2013 |
| JP | 2016-91359 A | 5/2016 |
| JP | 2016091359 A * | 5/2016 |

OTHER PUBLICATIONS

Office Action dated Jan. 7, 2021 in counterpart Indian Application No. 201947018969.
Chinese Office Action and Search Report for Chinese Application No. 201680091308.9, dated Apr. 6, 2021, with English translation.
Pathak et al., "Context Encoders: Feature Learning by Inpainting", 2016 IEEE Conference on Computer Vision and Pattern Recognition (CVPR), Date of Conference: Jun. 27-30, 2016, total 12 pages.
Radford et al., "Unsupervised Representation Learning with Deep Convolutional Generative Adversarial Networks", Under review as a conference paper at ICLR 2016, pp. 1-16.
Sauvola et al., "Adaptive Document Image Binarization", Pattern Recognition, 2000, vol. 33, pp. 225-236.
Vincent et al., "Stacked Denoising Autoencoders: Learning Useful Representations in a Deep Network with a Local Denoising Criterion", Journal of Machine Learning Research, 2010, vol. 11, pp. 3371-3408.
Zeiler et al., "Adaptive Deconvolutional Networks for Mid and High Level Feature Learning", 2011 International Conference on Computer Vision, Date of Conference: Nov. 6-13, 2011, total 8 pages.
"Machine Vision Surface Defect Detection Technology and its Application in Steel Industry"; Jun. 30, 2017, pp. 109-110.
Office Action dated Oct. 11, 2021 in corresponding Chinese Patent Application No. 201680091308.9.

* cited by examiner

IMAGE DATA TO BE INSPECTED | RESTORED DATA | DIFFERENCE

THRESHOLD PROCESSING RESULT

IMAGE DATA TO BE INSPECTED

TWO-DIMENSIONAL MASK (1)  (3)  (2)

INSPECTION DEVICE AND INSPECTION METHOD

TECHNICAL FIELD

The present invention relates to an inspection device and an inspection method for inspecting, from obtained data of an object, whether the object has a defect (or an abnormality), such as a lack, an erroneous arrangement, or a fault.

BACKGROUND ART

Capturing an object with a camera and a machine automatically inspecting, from the obtained image data, whether the object is defective is a technique important for automation or labor-saving of visual inspection or appearance inspection performed in a manufacturing process of an industrial product, for example.

Conventionally, for inspection as to whether an object has a defect, such as a lack, an erroneous arrangement, or a fault, for example, an inspection device of Patent Literature 1 stores multiple image data sets obtained by capturing an object, calculates, from the multiple image data sets, for each pixel having the same coordinates, a range of the brightness value in which it is determined that the object has no defect, and sets it as a criterion for inspection as to whether the object has a defect. The inspection device determines, for each pixel having the same coordinates, whether the brightness value of an image data set obtained by capturing an object to be inspected is within the set range of the brightness value in which it is determined that the object has no defect, thereby inspecting whether the object has a defect, such as a lack, an erroneous arrangement, or a fault.

CITATION LIST

Patent Literature

Patent Literature 1: Japanese Patent Application Publication No. 2013-32995

SUMMARY OF INVENTION

Technical Problem

However, the above conventional inspection device calculates, for each pixel, the range of the brightness value in which it is determined that the object has no defect, and determines and inspects, for each pixel, whether the object has a defect, such as a lack, an erroneous arrangement, or a fault. Thus, it is required that the positional relationship between the object and the camera in capturing be always constant, and highly accurate alignment be performed for all the pixels. With the introduction of the inspection device, it is required to introduce a jig for fixing the camera and object, a positioning device, and the like to highly accurately perform alignment for all the pixels. This leads to increase in introduction cost and increase in computer calculation time.

The present invention has been made to solve the problems as described above, and is intended to provide an inspection device and an inspection method for inspecting whether an object has a defect, such as a lack, an erroneous arrangement, or a fault while easing the requirements that the object and a camera be securely fixed and highly accurate alignment be performed for each pixel of image data obtained by capturing the object, compared to the conventional inspection device.

Solution to Problem

An inspection device according to the present invention includes: an analyzing unit to calculate a parameter representing a feature of data of an object having no defect by performing dimensionality reduction for reducing a dimensionality of data on the data of the object having no defect, and perform dimensionality reduction on data of an object to be inspected by using the parameter; a restoring unit to generate restored data obtained by restoring the data of the object to be inspected subjected to the dimensionality reduction by the analyzing unit; a determination unit to output a determination result indicating whether the object to be inspected is defective, on a basis of a magnitude of a difference between the data of the object to be inspected and the restored data; and an output unit to output the determination result output by the determination unit.

Advantageous Effects of Invention

With the present invention, by calculating a parameter representing a feature of data of an object having no defect by performing dimensionality reduction for reducing a dimensionality of data on the data of the object having no defect, performing dimensionality reduction on data of an object to be inspected by using the parameter, generating restored data obtained by restoring the data of the object to be inspected subjected to the dimensionality reduction, and outputting a determination result indicating whether the object to be inspected is defective, on a basis of a magnitude of a difference between the data of the object to be inspected and the restored data, it is possible to inspect whether an object has a defect, such as a lack, an erroneous arrangement, or a fault while easing the requirements that the object and a camera be securely fixed and highly accurate alignment be performed for each pixel of image data obtained by capturing the object, compared to the conventional inspection device.

DESCRIPTION OF EMBODIMENTS

First Embodiment

Figure 1:
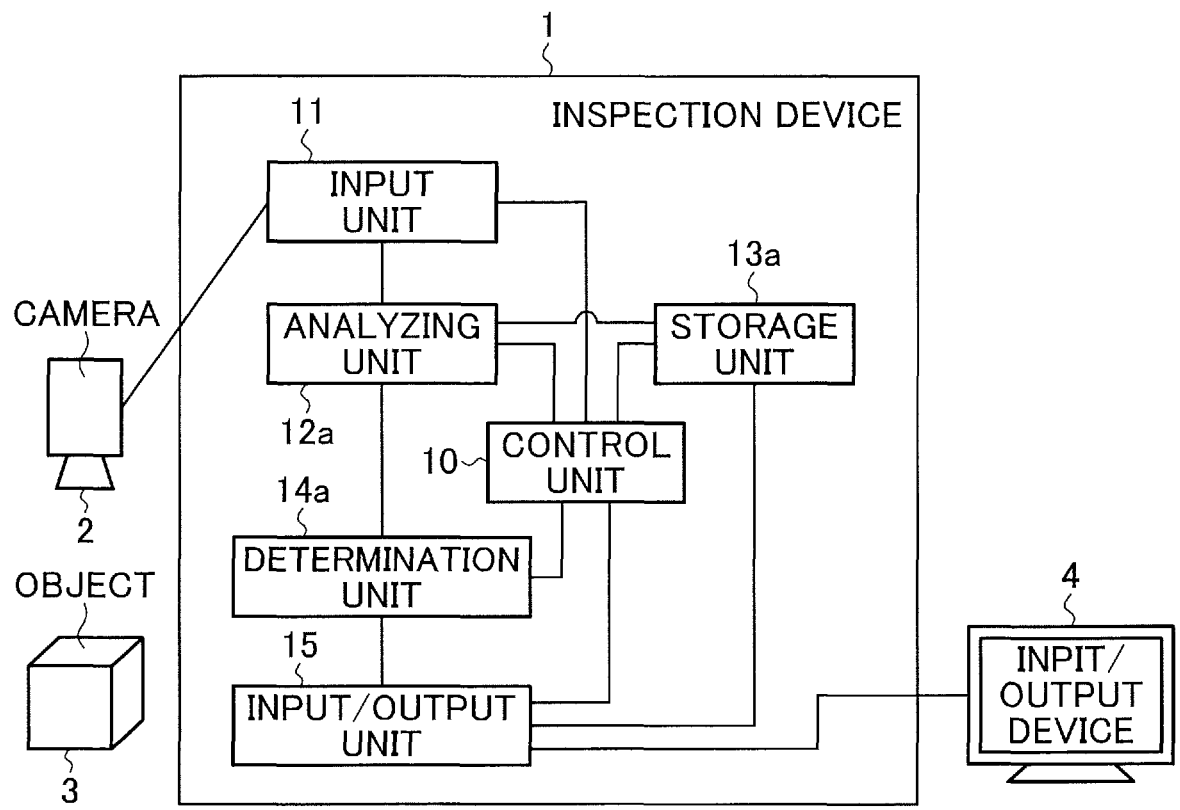
FIG. 1 is a functional block diagram of an inspection system including an inspection device according to a first embodiment of the present invention.

FIG. 1 is a functional block diagram of an inspection system including an inspection device 1 according to a first embodiment of the present invention.

The inspection system includes the inspection device 1 that inspects an object 3, a camera 2 that captures the object 3, and an input/output device 4 that receives inspection content and outputs an inspection result. The inspection device 1 receives, as input data, image data of the object 3 captured by the camera 2, analyzes it, and sends a result thereof to the input/output device 4.

The inspection device 1 includes a control unit (or controller) 10 that controls units, an input unit (or receiver) 11 into which image data is input, an analyzing unit (or analyzer) 12a that analyzes the image data input through the input unit 11, a storage unit (or memory) 13a that records a result of the analysis, a determination unit (or determiner) 14a that outputs, from a result of the analysis and the obtained image data, a determination result indicating whether the object 3 is defective (or abnormal), and an input/output unit 15 that outputs the determination result output by the determination unit 14a.

The control unit 10 sends and receives commands to and from the input unit 11, analyzing unit 12a, storage unit 13a, determination unit 14a, and input/output unit 15, thereby controlling the units.

The input unit 11 receives image data of the object 3 from the camera 2. The image data is an example of data of the object 3, and it is not limited to image data and may be data representing a waveform, a solid, or the like. The first embodiment assumes that the input image data is digital data, but it may be analog data.

The analyzing unit 12a selectively executes two different operation modes in accordance with a command sent from the control unit 10. Here, the two operation modes are a learning mode and an inspection mode. In the learning mode, it uses one or more image data sets of a normal object 3 having no defect (or abnormality) to perform dimensionality reduction for reducing the dimensionality (or number of dimensions) of the image data sets of the object 3 on the image data sets of the normal object 3 having no defect and thereby calculates a parameter representing a feature of the data sets of the normal object 3 having no defect, thereby learning how the normal state is. Thus, in the learning mode, the inspection device 1 does not perform inspection for defects of an object 3. The inspection for defects is performed in the inspection mode, which is performed after completion of the learning mode. Here, when the number of the image data sets of the normal object 3 having no defect is two or more, a single parameter representing a feature of the data sets of the normal object 3 is calculated. In the learning mode, it is required that the object 3 be in a normal state with no defect. If objects 3 are objects of the same type, it is possible to obtain the image data sets from the multiple different objects. Hereinafter, image data sets obtained by capturing an object 3 having no defect will be referred to as normal image data sets.

In the inspection mode, it performs, on an image data set of an object 3 to be inspected, the same dimensionality reduction as that performed in the calculation of the parameter representing the feature of the data sets of the normal object 3 learned in the learning mode.

The storage unit 13a stores a learning result, reads the learning result, and sends the learning result to the analyzing unit 12a in accordance with commands from the control unit 10. The learning result read here is a learning result corresponding to the dimensionality reduction method used in the learning mode.

The determination unit 14a restores the image data set of the object 3 to be inspected subjected to the dimensionality reduction, by the same method as that used for the dimensionality reduction, and outputs a determination result indicating whether the object 3 to be inspected is defective, to the input/output unit 15, on the basis of a magnitude of a difference between the restored data set, which is the restored image data set, and the image data set of the object 3 to be inspected. The determination unit 14a is an example of a unit serving as both a restoring unit (or restorer) and a determination unit (or determiner).

The input/output unit 15 outputs information indicating the progress of the learning or the like to the outside through the input/output device 4 in accordance with commands from the control unit 10. Here, it is assumed that an operator sees the input/output device 4 outside; however, this is not mandatory, and it is also possible to output a signal to an external control device or the like without intervention of an operator. The input/output unit 15 also outputs the determination result received from the determination unit 14a to the outside through the input/output device 4 in accordance with a command from the control unit 10. Here, it is assumed that an operator sees the input/output device 4 outside; however, this is not mandatory, and it is also possible to output a signal to an external control device or the like without intervention of an operator. The input/output unit 15 is an example of an output unit, and in the first embodiment, it includes an input unit in addition to an output unit.

The camera 2 obtains image data of an object 3 by capturing the object 3 and storing it in image data. The camera 2 sends the image data of the object 3 to the inspection device 1. The camera 2 is an example, and any capable of obtaining data of an object 3 may be used instead.

The input/output device 4 receives inspection content of the inspection device 1, and outputs an inspection result output by the inspection device 1. The input/output device 4 may be constituted by, for example, a display, a speaker, a keyboard, a mouse, and the like. The display is an example of a display unit.

Figure 2:
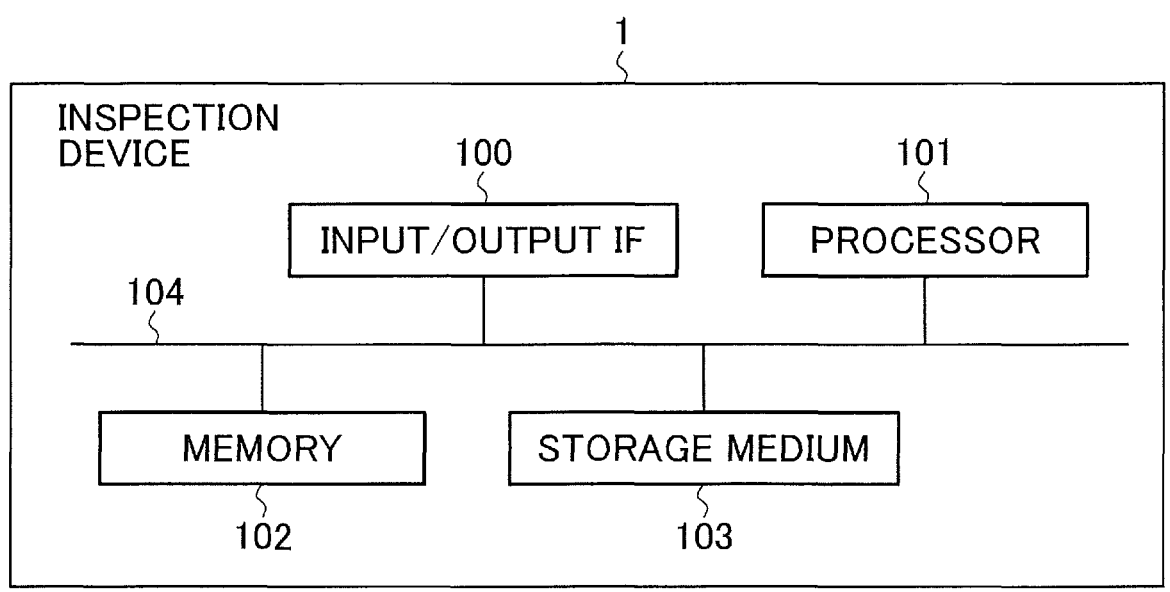
FIG. 2 is a hardware configuration diagram of the inspection device according to the first embodiment of the present invention.

FIG. 2 is a hardware configuration diagram of the inspection device 1 according to the first embodiment of the present invention. A configuration of the inspection device 1 according to the first embodiment of the present invention will be described with reference to FIG. 2.

In the first embodiment, the inspection device 1 is formed by a computer. The computer forming the inspection device 1 includes hardware including a bus 104, an input/output interface 100 that sends and receives data, a memory 102, a storage medium 103 that stores programs, learning data, and the like, and a processor 101 that reads and executes programs in the Storage medium 103 loaded in the memory 102. Hereinafter, the input/output interface 100 will be referred to as the input/output IF 100.

The bus 104 is a signal path that electrically connects the devices and through which data is communicated.

The input/output IF 100 sends and receives data. For example, when receiving a start signal and a setting signal to the inspection device 1 from the input/output device 4, the input/output IF 100 sends them to the control unit 10. Also, for example, when receiving a command signal from the control unit 10 to the analyzing unit 12a, the input/output IF 100 sends the command signal to the analyzing unit 12a. The input unit 11 and input/output unit 15 are implemented by the input/output IF 100.

The memory 102 functions as a work area into which programs stored in the storage medium 103 are loaded. The memory 102 is, for example, a random access memory (RAM).

The storage medium 103 stores a program for implementing functions of a program for the learning mode and a program for the inspection mode. The storage medium 103 also stores learning data or the like. The storage medium 103 is, for example, a read only memory (ROM), a flash memory, or a hard disk drive (HDD). The storage medium 103 also stores an operating system (OS). The storage unit 13a is implemented by the storage medium 103.

The processor 101 is connected to the other devices through the bus 104, and controls the other devices and the units. The processor 101 reads and executes programs in the storage medium 103 loaded in the memory 102. The processor 101 loads at least part of the OS stored in the storage medium 103 into the memory 102, and executes the programs while executing the OS. The processor 101 is an integrated circuit (IC) that performs processing. The processor 101 is, for example, a central processing unit (CPU). The control unit 10, analyzing unit 12a, and determination unit 14a are implemented by the processor 101 reading and executing programs in the storage medium 103 loaded in the memory 102.

Information indicating results of the respective devices, data, signal values, the values of variables, and the like are stored in the memory 102, storage medium 103, or a register or a cache memory in the processor 101.

The memory 102 and storage medium 103 may be a single device instead of separate devices.

The programs may be stored in a portable recording medium, such as a magnetic disc, a flexible disc, an optical disc, a compact disc, a digital versatile disc (DVD).

Next, operations of the inspection device 1 according to the first embodiment of the present invention will be described.

Figure 3:
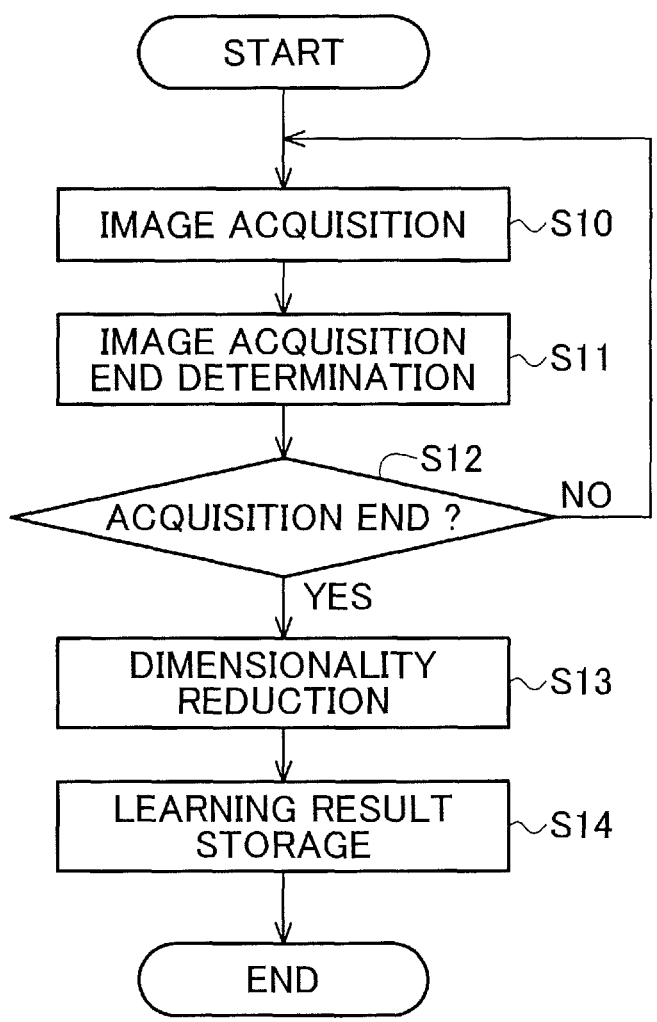
FIG. 3 is a flowchart illustrating an operation in a learning mode of the inspection device according to the first embodiment of the present invention.

FIG. 3 is a flowchart illustrating an operation in the learning mode of the inspection device 1 according to the first embodiment of the present invention. The operation in the learning mode of the inspection device 1 will be described below with reference to FIG. 3.

In step S10, the control unit 10 receives a start signal and a setting signal from the input/output device 4 through the input/output unit 15. It then gives a command to the input unit 11 in accordance with the setting signal. The input unit 11 receives a normal image data set of an object 3 from the camera 2. Here, the timing to receive a normal image data set may be predetermined to be, for example, 30 times a second, or may be determined in accordance with a command from the control unit 10. The control unit 10 gives a command to start processing of the learning mode to the analyzing unit 12a. The analyzing unit 12a switches to the learning mode by reading, from the memory 102, the program corresponding to the learning mode in the storage medium 103 loaded in the memory 102 and executing it in the processor 101. The analyzing unit 12a receives, from the input unit 11, the normal image data set of the object 3 captured by the camera 2.

In step S11, the analyzing unit 12a determines whether to further receive a normal image data set or end receiving a normal image data set. Here, the determination as to whether to end receiving a normal image data set may be determined by the analyzing unit 12a, or may be determined in accordance with a command from the control unit 10. In a case where it is determined by the analyzing unit 12a, receiving a normal image data set may be ended when the number of the received normal image data sets reaches a predesignated number, for example. The predesignated number is, for example, 100, 1000, or the like. In a case where it is determined in accordance with a command from the control unit 10, the control unit 10 may receive a command to end receiving a normal image data set, from the input/output device 4 through the input/output unit 15, and send it to the analyzing unit 12a, for example.

In step S12, the analyzing unit 12a returns to the reception of a normal image data set, or proceeds to the next step, in accordance with the determination result in step S11. When it is determined, in the determination as to whether to end receiving a normal image data set, that it is required to further receive a normal image data set, step S12 results in No, and it returns to step S10. When it is determined that receiving a normal image data set is to be ended, step S12 results in Yes, and it proceeds to the next step.

In step S13, the analyzing unit 12a performs dimensionality reduction by using the one or more received normal image data sets. Here, dimensionality reduction refers to converting high dimensional data, such as image data or three-dimensional solid data, into low dimensional data. The analyzing unit 12a performs learning by using the normal image data sets to obtain a data conversion method optimal for the normal image data sets, in the learning mode.

Known dimensionality reduction methods include principal component analysis, linear discriminant analysis, canonical correlation analysis, discrete cosine transform, random projection, an autoencoder with a neural network, and the like. Among these, principal component analysis is one of the most commonly used linear dimensionality reduction methods. The following describes a case where a principal component analysis is used.

The principal component analysis is a method for obtaining, from a large number of normal image data sets for learning distributed in a multidimensional space, a lower dimensional space representing a feature of the distribution. The lower dimensional space is referred to as a subspace. When the pixel values of the large number of normal image data sets received in step S10 are simply plotted in a space, they are often distributed in a cluster in a significantly low dimensional subspace.

Figure 4:
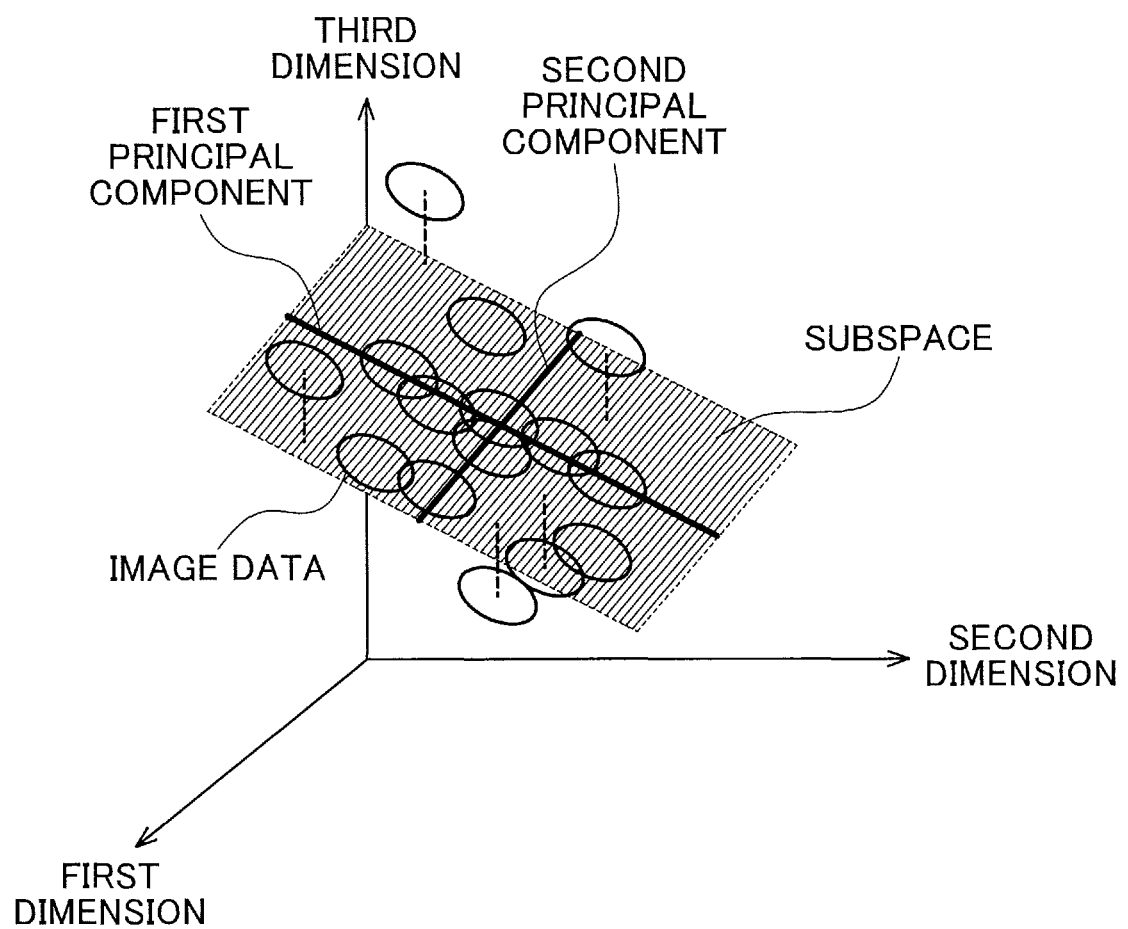
FIG. 4 is a conceptual diagram of a principal component analysis.

FIG. 4 is a conceptual diagram of the principal component analysis. As illustrated in FIG. 4, for example, normal image data sets distributed in a three-dimensional space are shown as a group contained in a plane. In the principal component analysis, the two-dimensional plane as in FIG. 4 representing a feature of the group is obtained. Here, a dimension has no physical meaning, and refers to an element contained in data. Dimensionality (or number of dimensions) refers to the number of elements contained in data. Here, one pixel is equal to one dimension, and for example, an image data set having 10 pixels vertically and 10 pixels horizontally has 10×10=100 pixels, and thus is a "100-dimensional data set." Thus, it is represented as a point in a 100-dimensional space. FIG. 4 is a schematic diagram illustrating the principal component analysis so that the principal component analysis is visualized. Each ellipse in FIG. 4 corresponds to one of the image data sets. In FIG. 4, since the image data sets are three-dimensionally represented, they are three-dimensional image data sets. This example shows a situation where the image data sets actually distributed in the three-dimensional space are represented in the two-dimensional subspace, i.e., reduced in dimensionality.

The total number of normal image data sets received in step S10 will be denoted by N, and the total number of pixels of each normal image data set will be denoted by K. For example, the value of N is 100, 1000, or the like, and the value of K is 1024 when the size of the normal image data sets is 32×32 pixels, and 409600 when the size is 640×640 pixels, or the like. When a number of a normal image data set is denoted by n, the normal image data set $x_n$ can be represented as a vector by equation (1), where T indicates a transposed vector.

$$x_n = (x_{n1}, x_{n2}, \ldots, x_{nK})^T, n=1,2,\ldots,N \quad (1)$$

Then, a mean vector M and variance-covariance matrix S thereof are obtained according to equations (2) and (3).

$$M = \frac{1}{N} \sum_{n=1}^{N} x_n \quad (2)$$

$$S = \frac{1}{N} \sum_{n=1}^{N} (x_n - M)(x_n - M)^T \quad (3)$$

In the principal component analysis, for the distribution of the normal image data sets in the space, a first principal component that is a straight line passing through the point that is the mean and extending in a direction with the largest variability is obtained. Next, a straight line of a second principal component being orthogonal to the first principal component, passing through the mean, and extending in a direction with the second largest variability is obtained. In this manner, principal components are obtained in sequence. The directions with large variability passing through the mean are equivalent to the problem of obtaining eigenvectors of the variance-covariance matrix S.

Specifically, eigenvalues $\lambda_j$ and eigenvectors $u_j$ satisfying equation (4) are obtained using the calculated variance-covariance matrix S, where j is a dimension number.

$$Su_j = \lambda_j u_j \quad (4)$$

Selecting the d eigenvectors $u_j$ corresponding to the first to d-th largest eigenvalues $\lambda_j$ yields d principal components ($u_1, u_2, \ldots, u_d$). Larger eigenvalues $\lambda_j$ indicate more principal components in the principal component analysis. By extracting principal components, parameters in the principal component analysis are sorted in order of importance. $d \leq K$, and in general, d is considerably smaller than K. $u_j$ is referred to as the j-th principal component. The principal components are mutually orthogonal, and may be referred to as bases. The values of the d principal components ($u_1, u_2, \ldots, u_d$) are an example of a parameter representing a feature of the data sets of the object 3.

The original normal image data sets before the dimensionality reduction can be represented as a linear combination of the principal components. By taking the first to d-th dimensions and discarding the others, i.e., (d+1)th and subsequent dimensions, the normal image data sets originally having K dimensions can be reduced to ones having d dimensions.

Here, the value of d is an important parameter affecting the performance of the inspection device 1 according to the first embodiment. By appropriately setting the value of d, it is possible to extract only important components commonly appearing in the normal image data sets received in step S10. Meanwhile, it is possible to eliminate unwanted components, such as variation between the objects 3 of the same type, variation between the image data sets due to the difference between their capture times, or noise of the camera.

However, when the value of d is too small, important components are eliminated, and when the value of d is too large, unwanted components are left.

For example, the value of d may be determined in accordance with a command from the control unit 10. In this case, the control unit 10 receives the value of d from the input/output device 4 through the input/output unit 15 and sends it to the analyzing unit 12a.

The analyzing unit 12a may also read and use the value of d stored in the memory 102 or storage medium 103. In this case, the previously stored value of d may be, for example, about one tenth or one fifth of the total number K of pixels of each image data set, or the like.

The analyzing unit 12a may also adaptively determine the value of d on the basis of characteristics of the normal image data sets for learning. In this case, it is effective to use a cumulative contribution ratio P calculated by equation (5)

$$P = \frac{100 \sum_{j=1}^{d} \lambda_j}{\sum_{j=1}^{K} \lambda_j} \quad (5)$$

The cumulative contribution ratio P is an indicator indicating how much characteristics of information contained in the original normal image data sets before dimensionality reduction can be represented by using the first to d-th components, and the analyzing unit 12a can perform dimensionality reduction appropriately for characteristics of the normal image data sets by obtaining the smallest value of d such that the value of P exceeds a threshold value.

The threshold value for the cumulative contribution ratio P may be, for example, determined in accordance with a command from the control unit 10. In this case, the control unit 10 receives the threshold value from the input/output device 4 through the input/output unit 15, and sends it to the analyzing unit 12a.

The analyzing unit 12a may also read and use the threshold value stored in the memory 102 or storage medium 103. In this case, the previously stored threshold value may be, for example, 80, 100, or the like.

Returning to FIG. 3, in step S14, after performing the dimensionality reduction, the analyzing unit 12a sends, to the storage unit 13a, the d principal components $(u_1, u_2, \ldots, u_d)$ as a parameter representing a feature of the data of the object 3 resulting from learning the normal image data sets. The storage unit 13a stores the parameter, which is a learning result output from the analyzing unit 12a, representing the feature of the data of the object 3 into the storage medium 103 in accordance with a command from the control unit 10. Although it has been described that the storage unit 13a stores the parameter, which is a learning result output from the analyzing unit 12a, representing the feature of the data of the object 3 into the storage medium 103 in accordance with a command from the control unit 10, it may be stored in the memory 102.

In the learning mode, after completion of the processing by the analyzing unit 12a, the control unit 10 gives a command to start processing to the input/output unit 15. In accordance with the command from the control unit 10, the input/output unit 15 outputs information indicating the progress of the learning or the like to the outside through the input/output device 4. Here, it is assumed that an operator sees the input/output device 4 outside; however, this is not mandatory, and it is also possible to output a signal to an external control device without intervention of an operator.

Figure 5:
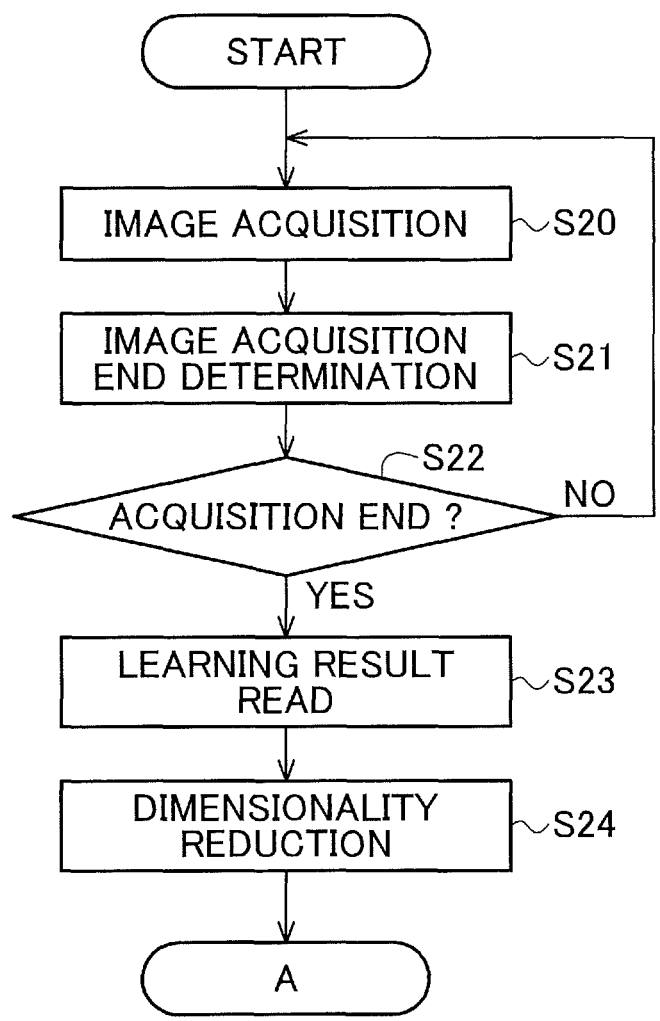
FIG. 5 is a part of a flowchart illustrating an operation in an inspection mode of the inspection device according to the first embodiment of the present invention.

FIG. 5 is a part of a flowchart illustrating an operation in the inspection mode of the inspection device 1 according to the first embodiment of the present invention. The operation in the inspection mode of the inspection device 1 will be described below with reference to FIG. 5.

In step S20, the control unit 10 receives a start signal and a setting signal from the input/output device 4 through the input/output unit 15. It then gives a command to the input unit 11 in accordance with the setting signal. The input unit 11 receives an image data set to be inspected of an object 3 from the camera 2. Here, the timing to receive an image data set may be predetermined to be, for example, 30 times a second, or may be determined in accordance with a command from the control unit 10. The control unit 10 gives a command to start processing of the inspection mode to the analyzing unit 12a. The analyzing unit 12a switches to the inspection mode by reading, from the memory 102, the program corresponding to the inspection mode in the storage medium 103 loaded in the memory 102 and executing it in the processor 101. The analyzing unit 12a receives, from the input unit 11, the image data set of the object 3 captured by the camera 2. The image data set to be inspected of the object 3 is an example of data of an object to be inspected.

In step S21, the analyzing unit 12a determines whether to further receive an image data set or end receiving an image data set. Here, the determination as to whether to end receiving an image data set may be determined by the analyzing unit 12a, or may be determined in accordance with a command from the control unit 10. In a case where it is determined by the analyzing unit 12a, receiving an image data set may be ended when the number of received image data sets reaches a predesignated number, for example. The predesignated number is, for example, 1, 10, or the like. In a case where it is determined in accordance with a command from the control unit 10, the control unit 10 may receive a command to end receiving an image data set, from the input/output device 4 through the input/output unit 15, and send it to the analyzing unit 12a, for example.

In step S22, the analyzing unit 12a returns to the reception of an image data set, or proceeds to the next step, in accordance with the determination result in step S21. When it is determined, in the determination as to whether to end receiving an image data set, that it is required to further receive an image data set, step S22 results in No, and it returns to step S20. When it is determined that acquiring an image data set is to be ended, step S22 results in Yes, and it proceeds to the next step.

In step S23, to read a result of the learning in the learning mode, the analyzing unit 12a sends a read request to the control unit 10. The storage unit 13a reads a required learning result from the storage medium 103 in accordance with a command from the control unit 10, and inputs it into the analyzing unit 12a. The learning result read here is a learning result corresponding to the dimensionality reduction method step S13 used in the learning mode. Specifically, in the first embodiment, since the principal component analysis is used as an example, the values of the d principal components $(u_1, u_2, \ldots, u_d)$, which are vectors representing principal components, are read as the leaning result.

In step S24, the analyzing unit 12a performs dimensionality reduction on the at least one received image data set to be inspected on the basis of the read learning result. The method for the dimensionality reduction is a dimensionality reduction method corresponding to the dimensionality reduction method step S13 used in the learning mode. Since the values of the d principal components $(u_1, u_2, \ldots, u_d)$, which are vectors representing principal components, have been obtained in the learning mode, the dimensionality reduction is performed by projecting the image data set to be inspected onto the d vectors. The analyzing unit 12a sends the image data set to be inspected and the vector resulting from the dimensionality reduction of the image data set to be inspected, to the determination unit 14a. Here, reference character A indicates the subsequent process, which will be described in detail later.

Figure 6:
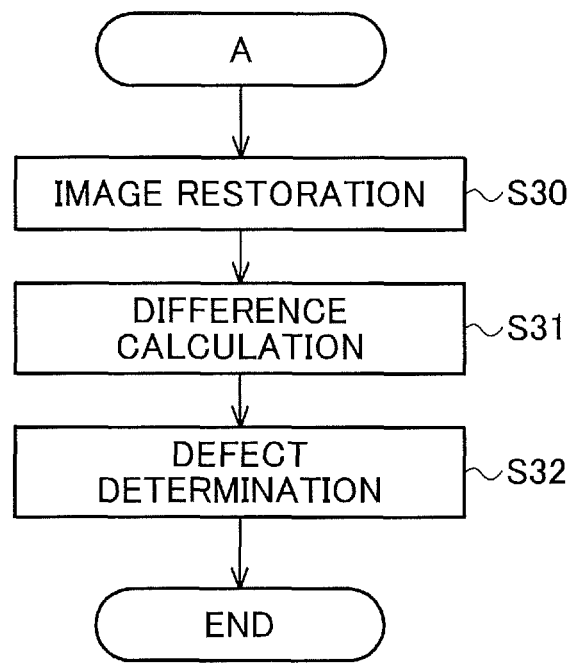
FIG. 6 is another part of the flowchart illustrating the operation in the inspection mode of the inspection device according to the first embodiment of the present invention.

FIG. 6 is another part of the flowchart illustrating the operation in the inspection mode of the inspection device 1 according to the first embodiment of the present invention. A continuation of the operation in the inspection mode of the inspection device 1 will be described below with reference to FIG. 6.

Following the process A subsequent to step S24, after completion of the processing by the analyzing unit 12a, in step S30, the control unit 10 gives a command to start processing to the determination unit 14a. In accordance with the command from the control unit 10, the determination unit 14a reads, from the memory 102, a program in the storage medium 103 loaded in the memory 102, and executes it in the processor 101. The determination unit 14a first restores the vector resulting from the dimensionality reduction of the image data set to be inspected received from the analyzing unit 12a, as an image data set. Here, the method for restoring the image data set is the same as that used for the dimensionality reduction in step S24. Thus, in the first embodiment, the restoration is performed using the principal component analysis.

When the principal component analysis is used for the dimensionality reduction, since the received vector resulting from the dimensionality reduction of the image data set to be inspected is represented by the lower dimensional subspace as illustrated in FIG. 4, the restoration of the image data set is performed by projecting the vector onto a space having the same dimensions as the original image data set.

In step S31, the determination unit 14a calculates a difference between the restored image data set and the image data set to be inspected. At this time, as the difference, a difference is calculated for each pixel. The difference may be an absolute difference. Hereinafter, the restored image data set will be referred to as the restored data set.

Figure 7:
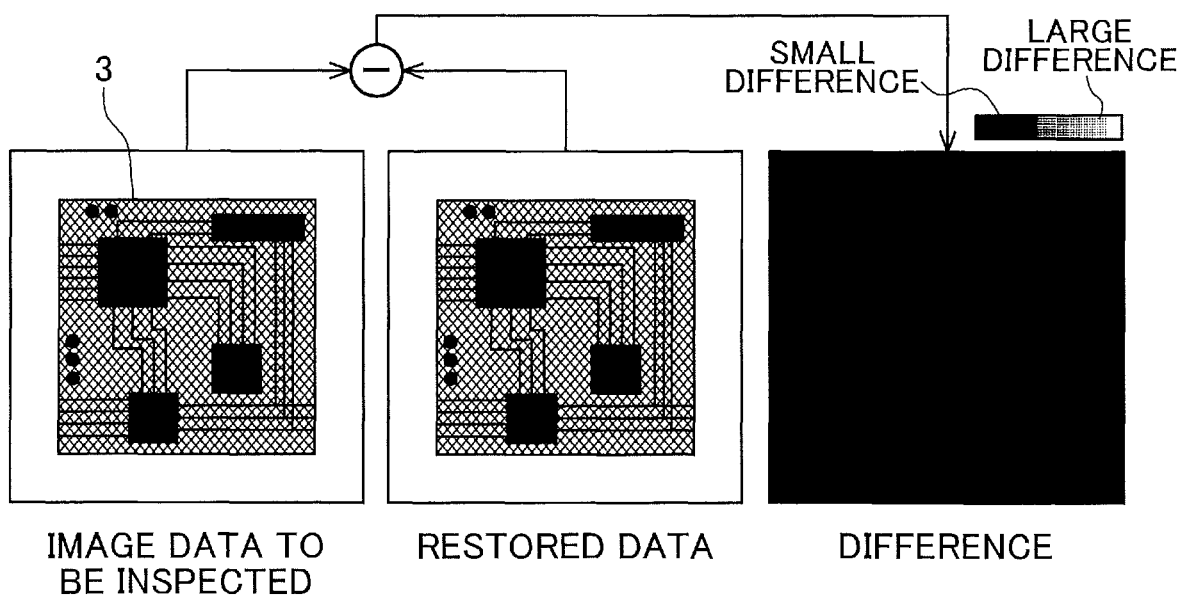
FIG. 7 illustrates an example where a printed board is taken as an object and it is inspected whether there is a defect on the board.

FIG. 7 illustrates an example where a printed board is taken as the object 3 and it is inspected whether there is a defect on the board. In FIG. 7, the left figure illustrates an image data set to be inspected, the center figure illustrates a restored data set, and the right figure illustrates a data set representing the difference between the image data set to be inspected and the restored data set. In the data set of the right figure representing the difference between the image data set to be inspected and the restored data set, a darker shade indicates a smaller difference, and a lighter shade indicates a larger difference. In a case where the board, which is the object 3 to be inspected, is normal, after the dimensionality reduction is performed, it is possible to restore an image data set that is nearly the same as the image data set to be inspected. This is because, in the learning mode, a method for efficiently representing a feature of the normal image data sets is learned, and in the inspection mode, when the object 3 to be inspected is normal, the image data set to be inspected is closely similar to the normal image data sets used for the learning.

Thus, as illustrated in FIG. 7, when the difference between the restored data set and the image data set to be inspected is calculated, the difference is nearly zero over the entire image data set.

On the other hand, in a case where the object 3 to be inspected is defective, after the dimensionality reduction is performed using the result of the learning with the normal image data sets, part significantly different from that of the normal image data sets cannot be properly restored.

Figure 8:
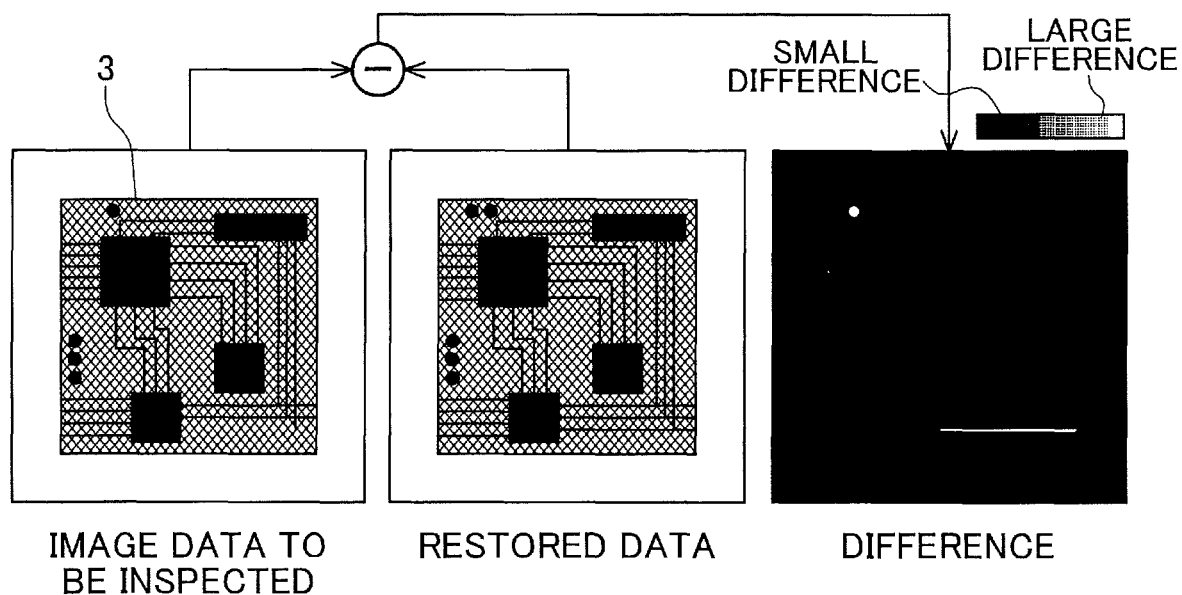
FIG. 8 illustrates an example where part of the board, which is an object to be inspected, is lacking.

FIG. 8 illustrates an example where part of the board, which is an object 3 to be inspected, is lacking. In FIG. 8, the left figure illustrates an image data set to be inspected, the center figure illustrates a restored data set, and the right figure illustrates a data set representing the difference between the image data set to be inspected and the restored data set. In the data set of the right figure representing the difference between the image data set to be inspected and the restored data set, a darker shade indicates a smaller difference, and a lighter shade indicates a larger difference. In this case, in the restored data set, the normal part is properly restored, but the lacking part cannot be properly restored since it is restored on the basis of the normal image data sets used in the learning mode.

Thus, as illustrated in FIG. 8, when a difference between the restored data set and the image data set to be inspected is calculated, the difference is large only in the part, which is the defective part, different from that of the normal image data sets.

Returning to FIG. 6, in step S32, on the basis of the difference between the restored data set and the image data set to be inspected, the determination unit 14a outputs a determination result indicating whether the image data set to be inspected is defective, to the input/output unit 15. The determination unit 14a performs threshold processing on the difference between the restored data set and the image data set to be inspected, and sets values for pixels where the difference is less than a threshold value to 0 and values for pixels where the difference is not less than the threshold value to 1. Here, 0 and 1 may be interchanged, and other values may be used.

The threshold value may be, for example, determined in accordance with a command from the control unit 10. In this case, the control unit 10 receives the threshold value from the input/output device 4 through the input/output unit 15, and sends it to the analyzing unit 12a.

The determination unit 14a may also read and use the threshold value stored in the memory 102 or storage medium 103. In this case, the previously stored threshold value is, for example, 100, 200, or the like.

The determination unit 14a may also adaptively determine the threshold value depending on the distribution of the difference. When a certain threshold value is determined and a group of the pixels having a pixel value not less than the threshold value is referred to as class 1 and a group of the other pixels is referred to as class 2, an inter-class variance and an intra-class variance are obtained from the pixel values of classes 1 and 2, and the threshold value is determined to maximize a degree of separation calculated from these values.

Figure 9:
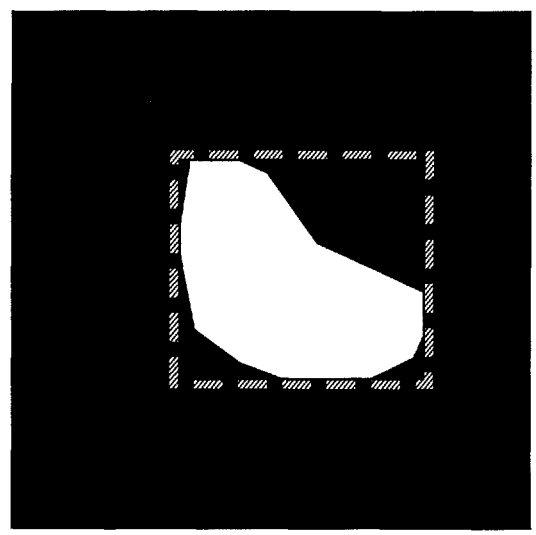
FIG. 9 illustrates a result of threshold processing.

FIG. 9 illustrates a result of the threshold processing. Suppose that the threshold processing yields the result as in FIG. 9. In FIG. 9, the region indicated by black is the region where the difference is less than the threshold value, and the region indicated by white is the region where the difference is not less than the threshold value.

The determination unit 14a determines a rectangle circumscribing a white region as indicated by the dashed line in FIG. 9, and sends information that there is a defect at the position, to the input/output unit 15. Hereinafter, a rectangle circumscribing a white region will be referred to as a bounding box. The sent information includes the upper left coordinates, vertical width, horizontal width, or the like of the bounding box. The determination unit 14a may send all the positions of the defective pixels to the input/output unit 15 instead of sending the bounding box to the input/output unit 15.

The determination unit 14a may also send the calculated difference image data set to the input/output unit 15.

It is also possible to provide a condition for the position or size of the bounding box, and neglect bounding boxes that do not satisfy the condition. This makes it possible to prevent false detection outside a target region in the image data set or prevent false detection due to noise.

The condition for the bounding box may be, for example, determined in accordance with a command from the control unit 10. In this case, the control unit 10 receives the condition from the input/output device 4 through the input/output unit 15, and sends it to the analyzing unit 12a.

The determination unit 14a may also read and use the condition stored in the memory 102 or storage medium 103. In this case, the previously stored condition is, for example, that the vertical width of the bounding box is not less than 3 pixels, that the horizontal width of the bounding box is not less than 3 pixels, that it exists within a two-dimensional mask for defining a region to be inspected, or the like.

Figure 10:
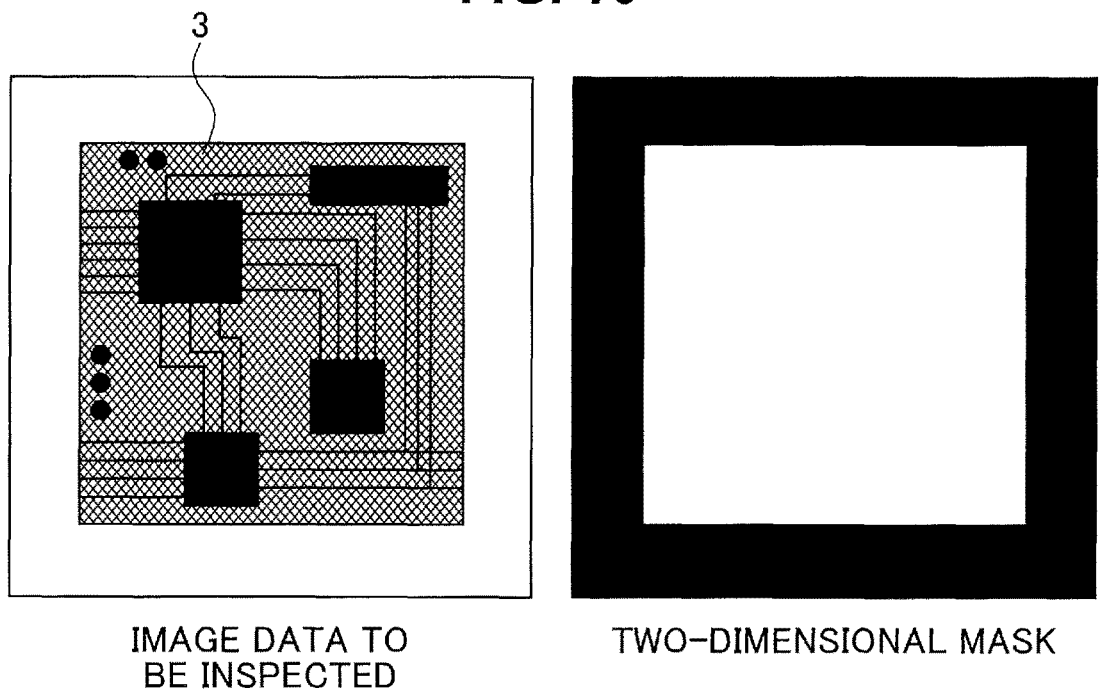
FIG. 10 illustrates an example of a two-dimensional mask for defining a region to be inspected.

FIG. 10 is an example of the two-dimensional mask for defining the region to be inspected. In FIG. 10, the left figure illustrates the image data set to be inspected, and the right figure illustrates the two-dimensional mask. The determination unit 14a applies the two-dimensional mask of the right figure to the image data set to be inspected of the left figure. In the two-dimensional mask of the right figure of FIG. 10, the region indicated by white is the region to be inspected, and the region indicated by black is a bounding box. Thus, when the two-dimensional mask of the right figure is applied to the image data set to be inspected of the left figure, defects are neglected in the region of the left figure corresponding to the bounding box indicated by black of the two-dimensional mask of the right figure.

Returning to FIG. 6, in the inspection mode, after completion of the processing by the determination unit 14a, the control unit 10 gives a command to start processing to the input/output unit 15. In accordance with the command from the control unit 10, the input/output unit 15 outputs the determination result received from the determination unit 14a to the outside through the input/output device 4. Here, it is assumed that an operator sees the input/output device 4 outside; however, this is not mandatory, and it is also possible to output a signal to an external control device or the like without intervention of an operator.

Figure 11:
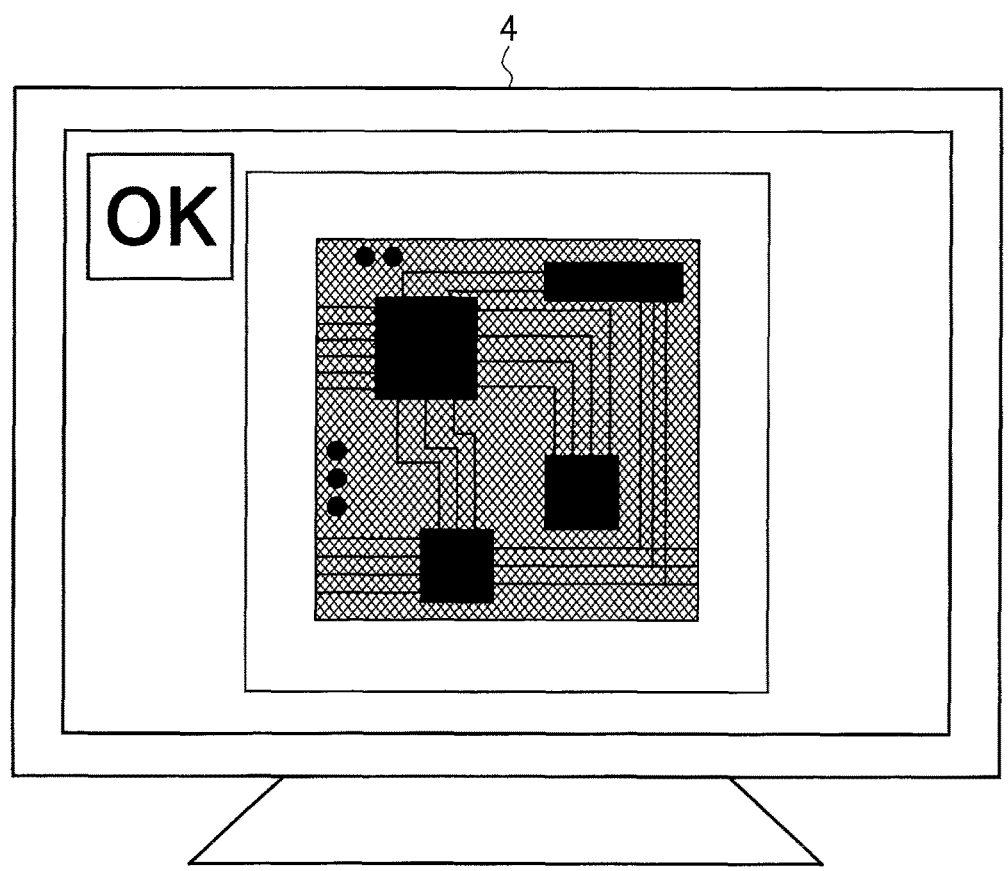
FIG. 11 illustrates an example of contents that an input/output unit commands an input/output device to display when the input/output device includes a display as its component.

FIG. 11 illustrates an example of contents that the input/output unit 15 commands the input/output device 4 to display when the input/output device 4 includes a display as its component.

FIG. 11 illustrates a case where no defect has been detected by the determination unit 14a. In this case, the image data set to be inspected is simply displayed, and a message for informing that there is no defect is displayed. The message for informing that there is no defect is, for example, the "OK" symbol illustrated at the upper left of FIG. 11. Instead of the "OK" symbol, other symbols, such as a "NO DEFECTS" symbol, a "NORMAL" symbol, or a white circle mark, may be displayed.

Figure 12:
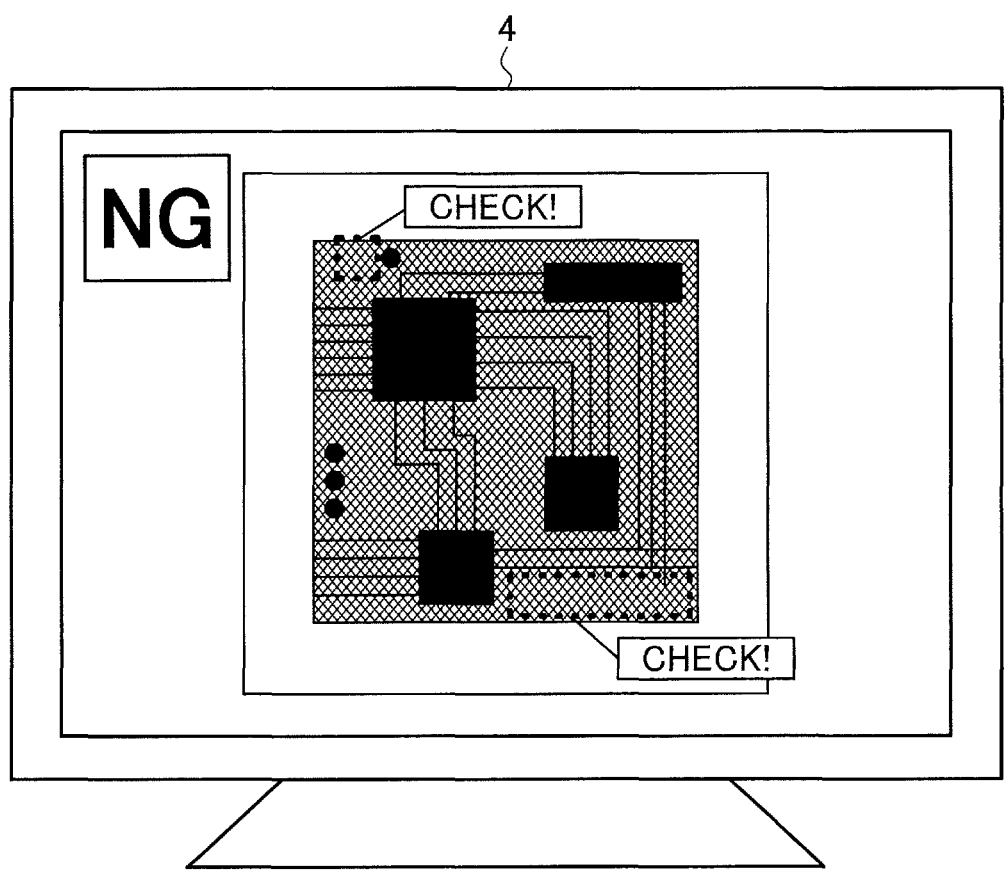
FIG. 12 illustrates another example of contents that the input/output unit commands the input/output device to display when the input/output device includes a display as its component.

FIG. 12 illustrates another example of contents that the input/output unit 15 commands the input/output device 4 to display when the input/output device 4 includes a display as its component.

FIG. 12 illustrates a case where two defective portions have been detected by the determination unit 14a. In this case, the detected defective portions are indicated by dotted lines superimposed on the image data set to be inspected, and a message for informing that a defect has been detected is displayed. The message for informing that a defect has been detected is, for example, the "NG" (no good) symbol illustrated at the upper left of FIG. 12. Instead of the "NG" symbol, other symbols, such as a "DEFECTIVE" symbol, a "NOT NORMAL" symbol, or a cross mark, may be displayed. It is also possible to attach "CHECK !" symbols as messages to the defective portions. The defective portions are determined on the basis of bounding boxes received from the determination unit 14a. The determination of the defective portions based on the bounding boxes may be performed by the determination unit 14a or input/output unit 15. The bounding boxes may or may not be displayed.

Figure 13:
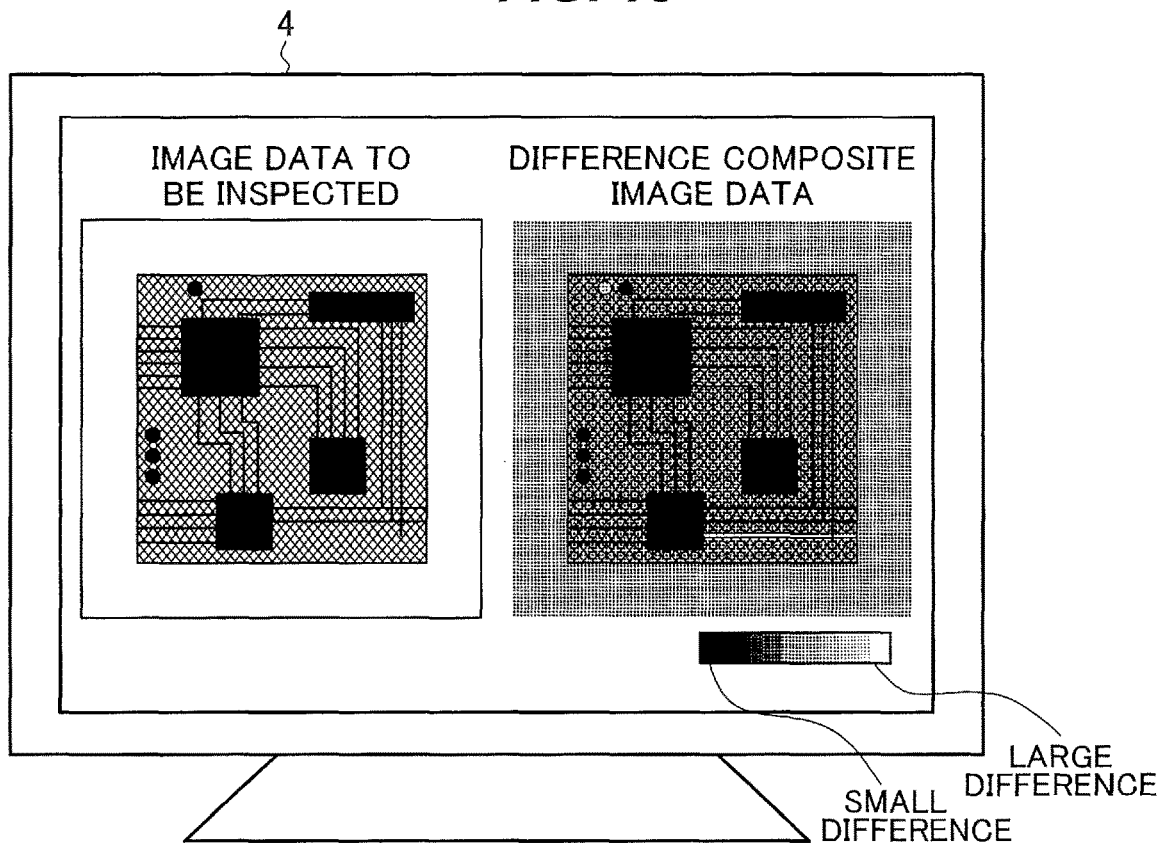
FIG. 13 illustrates still another example of contents that the input/output unit commands the input/output device to display when the input/output device includes a display as its component.

FIG. 13 illustrates still another example of contents that the input/output unit 15 commands the input/output device 4 to display when the input/output device 4 includes a display as its component.

FIG. 13 illustrates a case where two defective portions have been detected by the determination unit 14a, similarly to FIG. 12. However, instead of directly indicating the detected defective portions, the image data set to be inspected is displayed on the left side, and a difference composite image data set obtained by combining the difference image data set calculated by the determination unit 14a with the image data set to be inspected is displayed on the right side. In the difference composite image data set, a darker shade indicates a smaller difference, and a lighter shade indicates a larger difference. Thus, the white outstanding portions in the difference composite image data set on the right side of FIG. 13 appear prominently as portions of the image data set to be inspected where the difference from the normal state is large, which allows an operator who inspects for defects to easily perceive portions to which attention should be paid. As in FIG. 12, the determination of the defective portions based on the bounding boxes may be performed by the determination unit 14a or input/output unit 15.

The manners of the display by the input/output device 4 illustrated in FIGS. 11, 12, and 13 are just examples, and in practice, combinations of them or display manners different from them may be used. Also, the input/output device 4 may be constituted by a speaker instead of the display, and in this case, information may be output to the outside by voice, music, or the like.

By repeating the processing of the learning mode and the processing of the inspection mode as described above until a trigger to end processing, such as a power-off or a termination operation, occurs, it is possible to inspect whether the object 3 has a defect, such as a lack, an erroneous arrangement, or a fault while easing the requirements that the object 3 and the camera 2 be securely fixed and highly accurate alignment be performed for each pixel of image data obtained by capturing the object 3. Although it has been described that the processing of the learning mode and the processing of the inspection mode are repeated, the processing of the learning mode may be performed only once instead of being repeated. Likewise, the processing of the inspection mode may be performed only once instead of being repeated.

As described above, the inspection device 1 included in the inspection system of the first embodiment calculates a parameter representing a feature of data of an object 3 having no defect by performing dimensionality reduction on the data of the object 3 having no defect, performs dimensionality reduction on data of an object 3 to be inspected by using the parameter, generates restored data obtained by restoring the data of the object 3 to be inspected subjected to the dimensionality reduction, and outputs, to the input/output unit 15, a determination result indicating whether the object 3 to be inspected is defective, on the basis of a magnitude of a difference between the data of the object 3 to be inspected and the restored data. Thus, it can inspect whether the object 3 has a defect, such as a lack, an erroneous arrangement, or a fault while easing the requirements that the object 3 and the camera 2 be securely fixed and highly accurate alignment be performed for each pixel of image data obtained by capturing the object 3, compared to the conventional inspection device.

Further, with dimensionality reduction using principal component analysis, the inspection device 1 included in the inspection system of the first embodiment can obtain an efficient characteristic obtained by extracting only a parameter representing a feature of the data of the object 3 that commonly appears in the normal image data sets. In this process, unwanted information, such as variation between the objects 3 of the same type, variation between the image data sets due to the difference between their capture times, or noise of the camera is discarded, which reduces the data size, and allows the storage capacity required by the storage medium 103 to be reduced.

Further, since the inspection device 1 included in the inspection system of the first embodiment learns image data of the object 3 in the normal state from the normal image data sets and performs the inspection, no defective state need be defined by a user, a developer, or the like. Thus, it does not cause a situation where a defect is missed due to incomplete definition of the defective states, and can be applied generally to any defects.

In the above inspection system of the first embodiment, the inspection device 1, camera 2, and input/output device 4 are separated from each other. However, either or both of the camera 2 and input/output device 4 may be included in the inspection device 1. Inspection systems configured in this manner can also provide the above advantages of the first embodiment.

In the above inspection system of the first embodiment, the determination unit 14a restores the image data of the object 3 to be inspected subjected to the dimensionality reduction, by the same method as that used for the dimensionality reduction, and outputs, to the input/output unit 15, a determination result indicating whether the object 3 to be inspected is defective, on the basis of a magnitude of a difference between the restored data, which is restored image data, and the image data of the object 3 to be inspected. The determination unit 14a is an example of a unit serving as both a restoring unit and a determination unit. However, a restoring unit that restores the image data of the object 3 to be inspected subjected to the dimensionality reduction by the same method as that used for the dimensionality reduction may be separately provided in the inspection device 1, or the analyzing unit 12a may have the function of the restoring unit. Inspection systems configured in this manner can also provide the above advantages of the first embodiment.

In the above inspection system of the first embodiment, the analyzing unit 12a uses principal component analysis in the dimensionality reduction of the object 3, the storage unit 13a stores a result of the principal component analysis, and the determination unit 14a performs the restoration by using principal component analysis. However, when there are different types of objects 3, the dimensionality reduction method may be changed depending on the type of the object 3. For example, it is possible that for an object 3 of a first type, the analyzing unit 12a uses principal component analysis in the dimensionality reduction of the object 3 of the first type, the storage unit 13a stores a result of the principal component analysis, and the determination unit 14a performs the restoration by using principal component analysis; and for an object 3 of a second type, the analyzing unit 12a uses linear discriminant analysis in the dimensionality reduction of the object 3 of the second type, the storage unit 13a stores a result of the linear discriminant analysis, and the determination unit 14a performs the restoration by using linear discriminant analysis. The number of types of objects 3 is not limited, and the combination of types of objects 3 and dimensionality reduction methods may be arbitrarily determined. However, for objects 3 of the same type, the same dimensionality reduction method is used. Inspection systems configured in this manner can also provide the above advantages of the first embodiment.

Second Embodiment

In the first embodiment, the analyzing unit 12a uses principal component analysis in the dimensionality reduction of the object 3, the storage unit 13a stores a result of the principal component analysis, and the determination unit 14a performs the restoration using principal component analysis. Principal component analysis is a typical example of liner dimensionality reduction methods. An analyzing unit 12b, a storage unit 13b, and a determination unit 14b according to a second embodiment use an autoencoder using a neural network for dimensionality reduction, as illustrated in FIGS. 14 to 20. An autoencoder using a neural network is known as a method capable of non-linear dimensionality reduction. Thus, since it is capable of non-liner dimensionality reduction, it can obtain the feature more efficiently than principal component analysis, which is a linear dimensionality reduction method. Otherwise, it is the same as the first embodiment.

Figure 14:
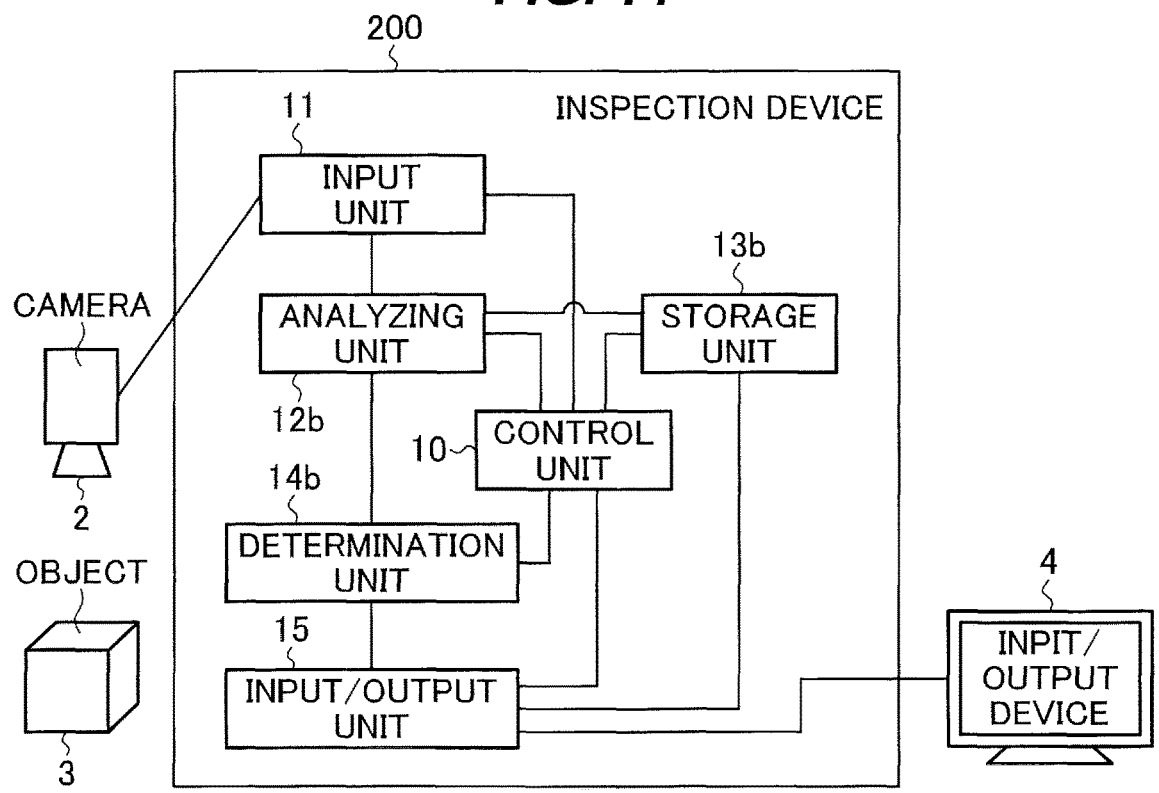
FIG. 14 is a functional block diagram of an inspection system including an inspection device according to a second embodiment of the present invention.

FIG. 14 is a functional block diagram of an inspection system including an inspection device 200 according to the second embodiment of the present invention. In the following description, already-described elements and operations are given the same reference characters, and the same descriptions thereof are omitted.

In the second embodiment, the analyzing unit 12b, storage unit 13b, and determination unit 14b are added as elements of the functional block diagram, instead of the analyzing unit 12a, storage unit 13a, and determination unit 14a of FIG. 1 of the first embodiment.

The analyzing unit 12b performs dimensionality reduction by using the autoencoder using the neural network, instead of principal component analysis used for dimensionality reduction in the analyzing unit 12a of the first embodiment. Otherwise, it is the same as the analyzing unit 12a.

The storage unit 13b stores a result of learning by the autoencoder using the neural network, reads the result of learning by the autoencoder using the neural network, and inputs it into the analyzing unit 12b, instead of the storage unit 13a of the first embodiment storing a result of learning by principal component analysis, reading the result of learning by principal component analysis, and inputting it into the analyzing unit 12a. Otherwise, it is the same as the storage unit 13a.

The determination unit 14b performs restoration by using the autoencoder using the neural network, instead of principal component analysis used for restoration in the determination unit 14b of the first embodiment. Otherwise, it is the same as the determination unit 14a.

A hardware configuration diagram of the inspection device 200 according to the second embodiment of the present invention is the same as in FIG. 2 of the first embodiment. A hardware configuration of the analyzing unit 12b is the same as that of the analyzing unit 12a, a hardware configuration of the storage unit 13b is the same as that of the storage unit 13a, and a hardware configuration of the determination unit 14b is the same as that of the determination unit 14a.

Next, an operation in the learning mode of the inspection device 200 according to the second embodiment of the present invention will be described.

Figure 15:
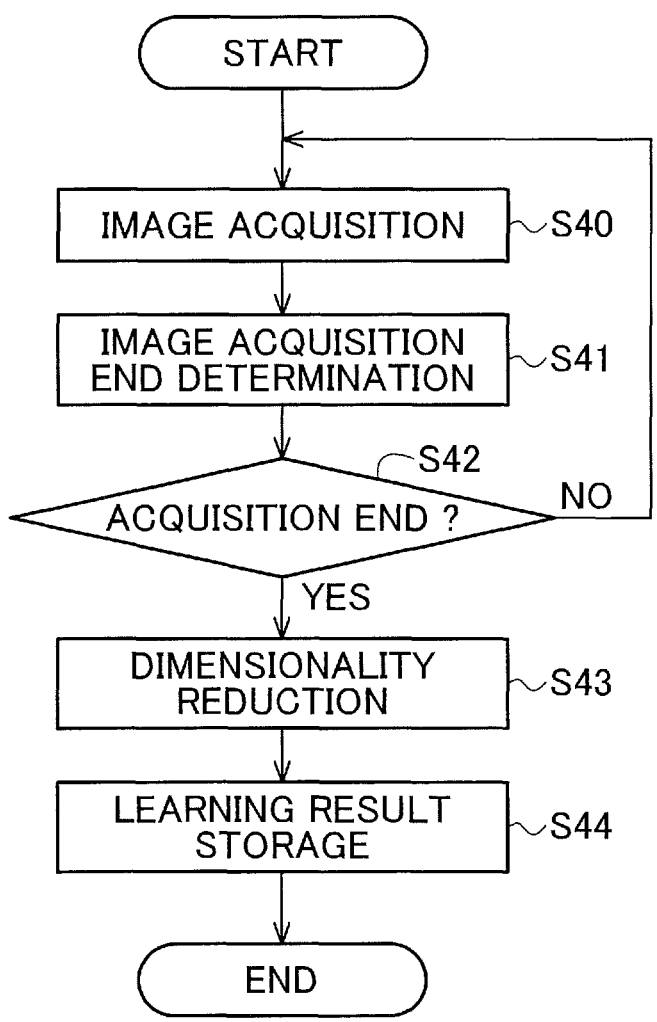
FIG. 15 is a flowchart illustrating an operation in a learning mode of the inspection device according to the second embodiment of the present invention.

FIG. 15 is a flowchart illustrating the operation in the learning mode of the inspection device 200 according to the second embodiment of the present invention. The operation in the learning mode of the inspection device 200 will be described below with reference to FIG. 15.

Steps S40, S41, and S42 are the same as steps S10, S11, and S12 of the first embodiment. However, the processes are performed by the analyzing unit 12b instead of the analyzing unit 12a.

In step S43, the analyzing unit 12b performs dimensionality reduction by using the one or more received normal image data sets. Here, dimensionality reduction refers to converting high dimensional data, such as image data or three-dimensional solid data, into low dimensional data, as in the first embodiment. The analyzing unit 12b performs learning by using the normal image data sets to obtain a data conversion method optimal for the normal image data sets, in the learning mode. A case where an autoencoder with a neural network is used for the dimensionality reduction will be described below.

Neural networks are computational models of a human brain mechanism in which neurons connected in a network through synapses perform learning and pattern recognition on the basis of the strength of current flowing therethrough, and the simplest model is called a perceptron.

Figure 16:
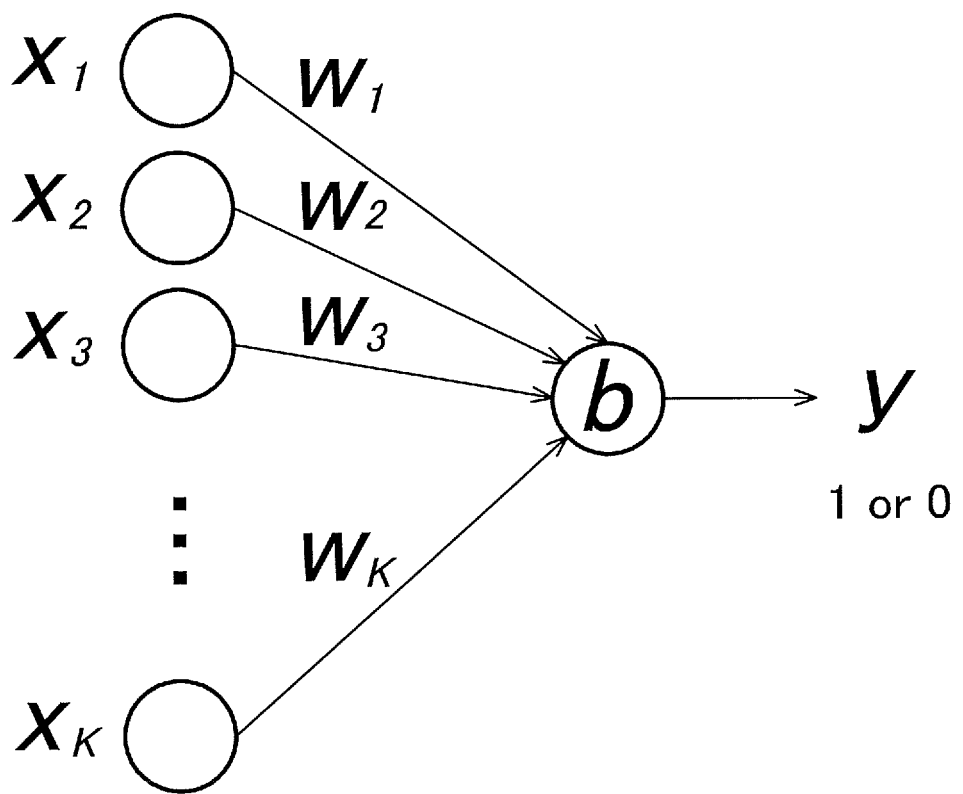
FIG. 16 is a diagram in which a neuron is modeled as a multi-input single-output node.

FIG. 16 is a diagram in which a neuron is modeled as a multi-input single-output node.

A perceptron is a diagram in which a neuron is modeled as a multi-input single-output node as illustrated in FIG. 16. As in the first embodiment, the total number of pixels of each normal image data set received in step S40 is denoted by K, and a dimension number is denoted by j. For example, the value of K is 1024 when the size of the normal image data sets is 32×32 pixels, and 409600 when the size is 640×640 pixels, or the like. The perceptron is composed of a linear weighted sum obtained by weighting the pixels $x_j$ of a normal image data set as the input data set by weights $w_j$ and subtracting a bias b, and a threshold logic function $z(u)$ that outputs 1 or 0 depending on whether the linear weighted sum is positive or negative. A group of the pixels $x_j$ of the normal image data set as the input data set makes a vector x of the normal image data set, and the group of the weights $w_j$ makes a weight vector w. When the output data set is denoted by y, the perceptron is represented by equation (6). FIG. 16 illustrates a calculation for a single image data set, and when the number of the image data sets is 1000, the same calculation is performed 1000 times.

$$y = z\left(\sum_{j=1}^{K} w_j x_j - b\right) \text{ where } \begin{cases} z(u) = 1 & \text{if } u > 0 \\ z(u) = 0 & \text{if } u \leq 0 \end{cases} \quad (6)$$

Equation (6) is a two-class discriminant function that takes a value of 1 or 0 depending on whether the threshold logic function $z(u)$ of the pixels $x_j$ of the normal image data set as the input data set belongs to class c1 or class c2. For a discriminant function, for example, class c1 for which image data sets of dogs are collected and class 2 for which image data sets of cats are collected are prepared in advance, and each image data set is labeled as image data of a dog or image data of a cat. When an unlabeled image data set of a dog is input into the discriminant function as the input data set, and it is determined, from the image data sets of the dogs of class c1 and the image data sets of the cats of class c2, whether the unlabeled image data set as the input data set is an image data set of a dog of class c1 or an image data set of a cat of class c2, so that the unlabeled image data set of the dog as the input data set is determined to be an image data set of a dog. More generally, the threshold logic function $z(u)$ of the perceptron can be replaced with other various functions called activation functions. The examples include a sigmoid function, a ReLU, and the like.

In equation (6), multiple data sets belonging to class c1 and multiple data sets belonging to class c2 are prepared in advance. Here, the prepared data sets belonging to classes c1 and c2 are referred to as learning data sets. By learning the weight vector w so that for each learning data set, it can be determined whether the learning data set belongs to class c1 or c2, when a new data set is input, its class can be determined. The values of the weight vector w are an example a parameter representing a feature of data of the object 3.

Figure 17:
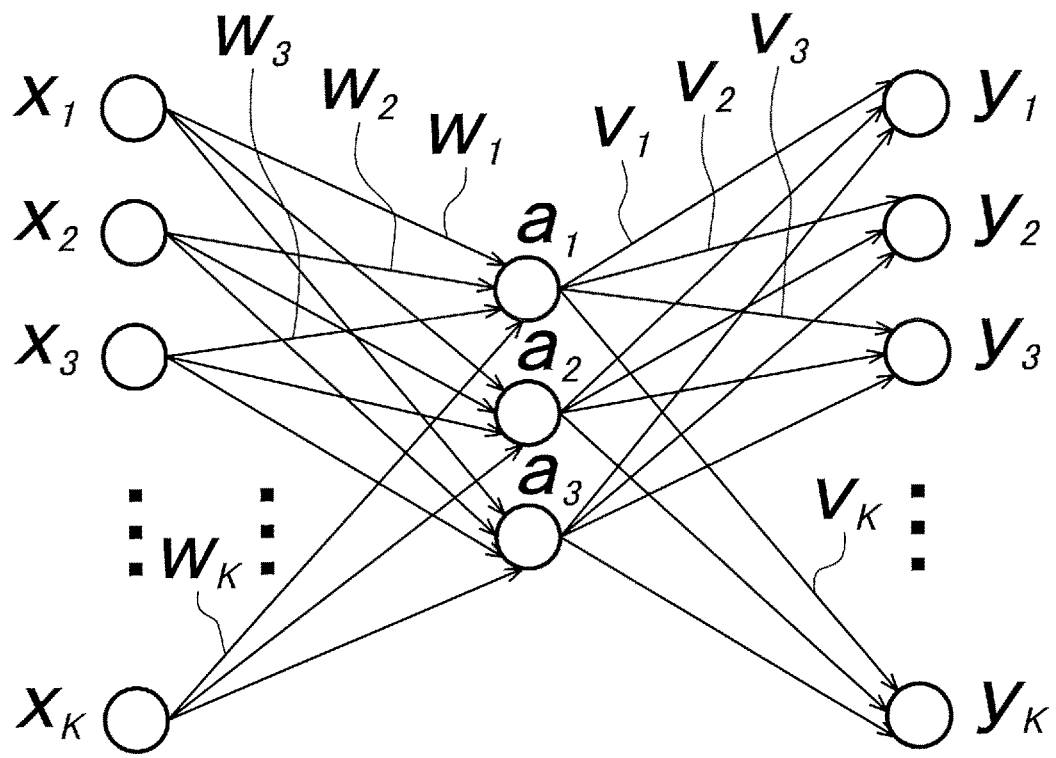
FIG. 17 illustrates an example of a sandglass-type neural network.

FIG. 17 illustrates an example of a sandglass-type neural network.

An autoencoder is a sandglass-type neural network in which the number of nodes in a hidden layer between an input layer into which a data set is input and an output layer from which a data set is output is less than the number of nodes in the input layer and output layer, as illustrated in FIG. 17. The left end of the network illustrated in FIG. 17 is the input layer, the right end of the network illustrated in FIG. 17 is the output layer, and the middle of the network illustrated in FIG. 17 is the hidden layer. Here, as in FIG. 16, the total number of pixels of each normal image data set received in step S40 is denoted by K, and a dimension number is denoted by j. For example, the value of K is 1024 when the size of the normal image data sets is 32×32 pixels, and 409600 when the size is 640×640 pixels, or the like. The input data set is a vector x of a normal image data set that is a group of the pixels $x_j$ of the normal image data set, and groups of weights $w_j$ are weight vectors w. A vector of the hidden layer is denoted by $a_{j'}$. The output data set is a vector y of an image data set that is a group of pixels $y_j$ and that is nearly the same as the vector x of the normal image data set, which is a group of the pixels $x_j$ of the normal image data set; groups of weights $v_j$ are weight vectors v. Multiplying the vector x of the normal image data set, which is a group of the pixels $x_j$ of the normal image data set as the input data set, by the weight vectors w, which are groups of the weights $w_{j'}$, gives the vector $a_j$ of the hidden layer; multiplying the vector $a_j$ of the hidden layer by the weight vectors v, which are groups of the weights $v_{j'}$, gives the vector y of the image data set, which is a group of the pixels $y_j$ and is nearly the same as the vector x of the normal image data set, which is a group of the pixels $x_j$ of the normal image data set. The vector $a_j$ of the hidden layer represents principal components of the image data set, and the values of the weight vectors w and the values of the weight vectors v are an example of a parameter representing a feature of the data of the object 3. FIG. 17 illustrates a calculation for a single image data set, and when the number of the image data sets is 1000, the same calculation is performed 1000 times.

The autoencoder learns the weights of each node so that the output data set closely matches the input data set, with respect to learning data sets. This is known to allow the hidden layer to have a lower dimensional feature that holds as much information in the input data set as possible.

Returning to FIG. 15, in step S43, with the normal image data sets acquired in step S40 as input data sets, by training the autoencoder so that the output data sets closely matches the input data sets, it is possible to extract, in the hidden layer, only important components commonly appearing in the normal image data sets. That is, the autoencoder is trained so that the normal image data sets input as input data sets matches the image data sets obtained by restoring the input data sets and output through the hidden layer, in terms of important components commonly appearing in the normal image data sets. Meanwhile, it is possible to eliminate unwanted components, such as variation between the objects of the same type, variation between the images due to the difference between their capture times, or noise of the camera.

Figure 18:
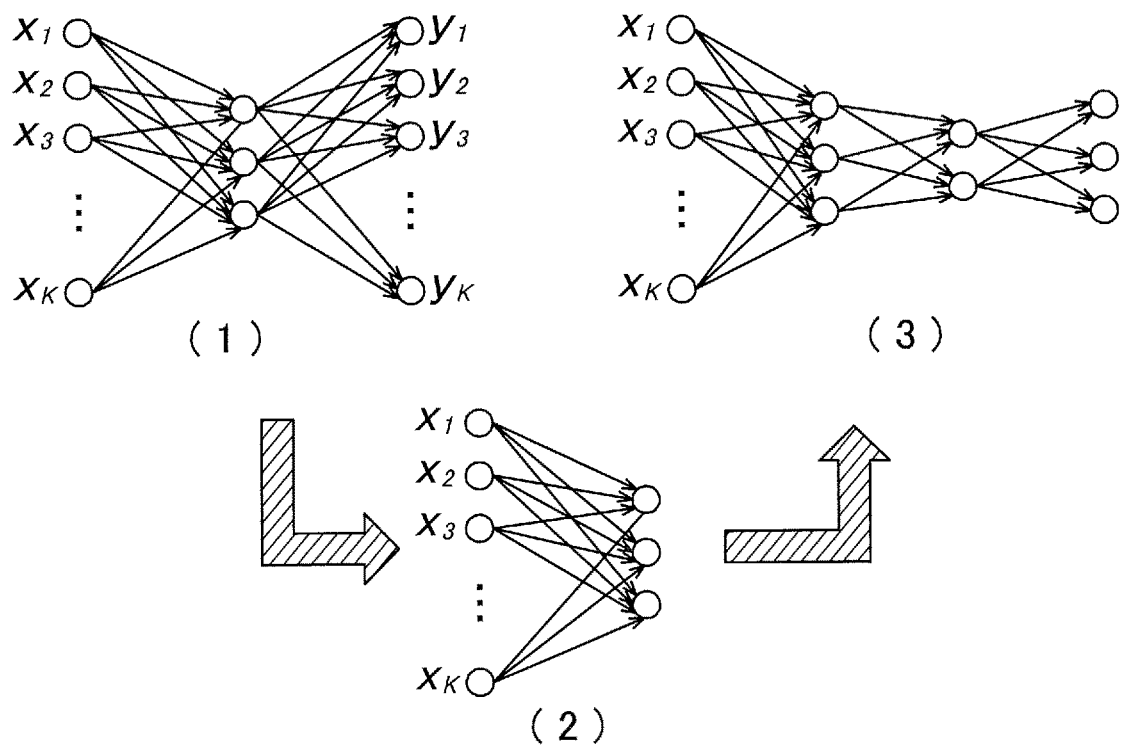
FIG. 18 is an example illustrating a process in which the number of hidden layers of an autoencoder is changed.

FIG. 18 is an example illustrating a process in which the number of hidden layers of the autoencoder is changed.

Although the autoencoder illustrated in FIG. 17 has one hidden layer, the total number of hidden layers can be freely changed. The total number is easy to change, and as illustrated in (1) of FIG. 18, the autoencoder with one hidden layer illustrated in FIG. 17 is first trained. Then, as illustrated in (2) of FIG. 18, by removing the output layer of the autoencoder and leaving the input layer and hidden layer, a network for reducing the dimensionality of the input data set is obtained. Then, as illustrated in (3) of FIG. 18, by using the dimensionally reduced data set as an input data set to newly train an autoencoder having weight vectors different from those of (1) of FIG. 18, it is possible to further reduce the dimensionality.

Here, the number of layers of the autoencoder is an important parameter affecting the performance of the inspection device 200 according to the second embodiment. By appropriately setting the number of layers, it is possible to extract only important components commonly appearing in the normal image data sets acquired in step S40. Meanwhile, it is possible to eliminate unwanted components, such as variation between the objects 3 of the same type, variation between the image data sets due to the difference between their capture times, or noise of the camera.

However, when the number of layers is too large, important components are eliminated, and when the number of layers is too small, unwanted components are left.

The number of layers may be determined in accordance with a command from the control unit 10, for example. In this case, the control unit 10 receives the number of layers from the input/output device 4 through the input/output unit 15, and sends it to the analyzing unit 12b.

Also, the analyzing unit 12b may read and use the value of the number of layers stored in the memory 102 or storage medium 103. The value of the number of layers previously stored in this case may be, for example, about 5, 10, or the like.

Returning to FIG. 15, after performing the dimensionality reduction, in step S44, the analyzing unit 12b sends the values of the weight vectors of each node, as a result of learning of the normal image data sets, to the storage unit 13b. The number of the stored values of the weight vectors depends on the number of the layers. The storage unit 13b stores the learning result output from the analyzing unit 12b into the storage medium 103 in accordance with a command from the control unit 10. Although it has been described that the storage unit 13b stores the learning result output from the analyzing unit 12b into the storage medium 103 in accordance with a command from the control unit 10, it may be stored in the memory 102.

In the learning mode, after completion of the processing by the analyzing unit 12a, the control unit 10 gives a command to start processing to the input/output unit 15. In accordance with the command from the control unit 10, the input/output unit 15 outputs information indicating the progress of the learning or the like to the outside through the input/output device 4. Here, it is assumed that an operator sees the input/output device 4 outside; however, this is not mandatory, and it is also possible to output a signal to an external control device or the like without intervention of an operator.

Figure 19:
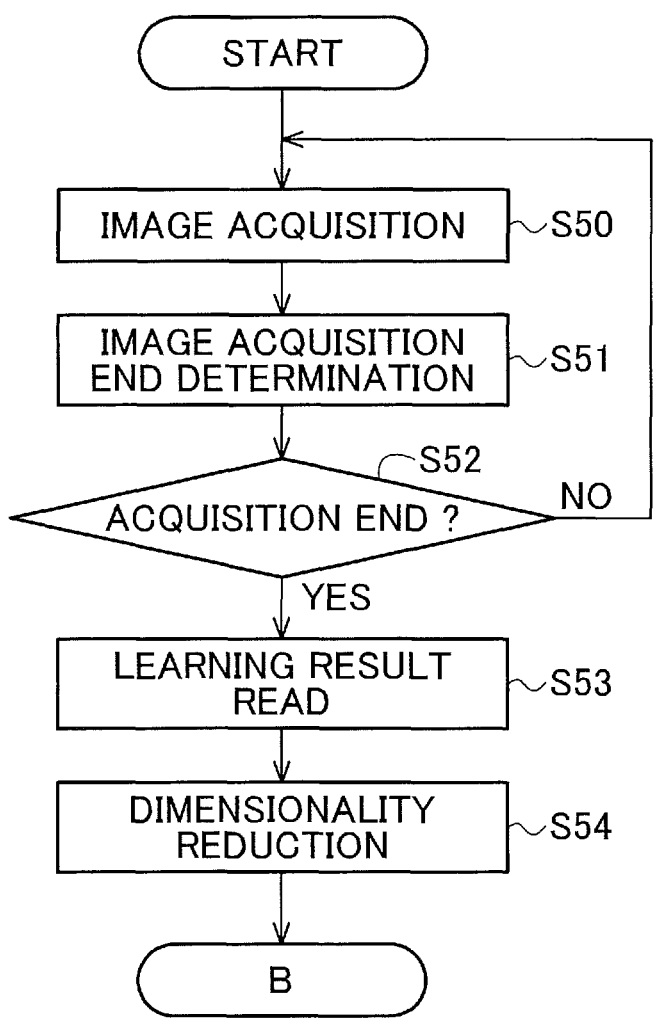
FIG. 19 is a part of a flowchart illustrating an operation in an inspection mode of the inspection device according to the second embodiment of the present invention.

FIG. 19 is a part of a flowchart illustrating an operation in the inspection mode of the inspection device 200 according to the second embodiment of the present invention. The operation in the inspection mode of the inspection device 200 will be described below with reference to FIG. 19.

Steps S50, S51, and S52 are the same as steps S20, S21, and S22 of the first embodiment. However, the processes are performed by the analyzing unit 12b instead of the analyzing unit 12a.

In step S53, to read a result of the learning in the learning mode, the analyzing unit 12b sends a read request to the control unit 10. The storage unit 13b reads a required learning result from the storage medium 103 in accordance with a command from the control unit 10, and inputs it into the analyzing unit 12b. The learning result read here is a learning result corresponding to the dimensionality reduction method step S43 used in the learning mode. In the second embodiment, since the autoencoder with the neural network is used as an example, the values of the weight vectors of each node are read as the learning result.

In step S54, the analyzing unit 12b performs dimensionality reduction on the at least one received image data set to be inspected on the basis of the read learning result. The method for the dimensionality reduction is a dimensionality reduction method corresponding to the dimensionality reduction method step S43 used in the learning mode. Since the values of the weight vectors of each node have been obtained in the learning mode, it is possible to perform the dimensionality reduction by inputting the image data set to be inspected into a neural network with the same weights. The analyzing unit 12b sends the image data set to be inspected and the vector resulting from the dimensionality reduction of the image data set to be inspected, to the determination unit 14b. The vector resulting from the dimensionality reduction of the image data set to be inspected is the output data set that is the values of the output layer. Here, reference character B indicates the subsequent process, which will be described in detail later.

Figure 20:
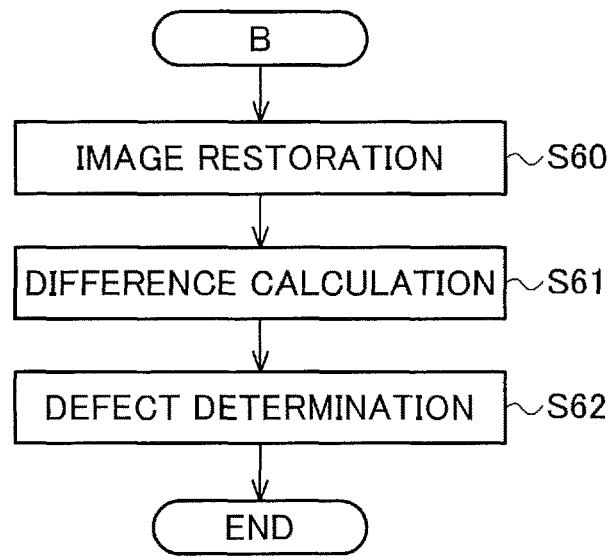
FIG. 20 is another part of the flowchart illustrating the operation in the inspection mode of the inspection device according to the second embodiment of the present invention.

FIG. 20 is another part of the flowchart illustrating the operation in the inspection mode of the inspection device 200 according to the second embodiment of the present invention. A continuation of the operation in the inspection mode of the inspection device 200 will be described below with reference to FIG. 20.

Following the process B subsequent to step S54, after completion of the processing by the analyzing unit 12b, in step S60, the control unit 10 gives a command to start processing to the determination unit 14b. In accordance with the command from the control unit 10, the determination unit 14b reads, from the memory 102, a program in the storage medium 103 loaded in the memory 102, and executes it in the processor 101. The determination unit 14b first restores the vector resulting from the dimensionality reduction of the image data set to be inspected received from the analyzing unit 12b, as an image data set. Here, the method for restoring the image data set is the same as that used in the dimensionality reduction in step S54. Thus, in the second embodiment, the restoration is performed using the autoencoder with the neural network.

When a neural network has been used in the dimensionality reduction, since the output of the neural network is a vector, the restoration of the image data set is performed by rearranging the vector in a two-dimensional array. Depending on the type of the used neural network, the output of the neural network may be a two-dimensional image data set. In this case, no image data restoration is required.

Steps S61 and S62 are the same as steps S31 and S32 of the first embodiment. However, the processing is performed by the analyzing unit 12b instead of the analyzing unit 12a, by the storage unit 13b instead of the storage unit 13a, and by the determination unit 14b instead of the determination unit 14a.

By repeating the processing of the learning mode and the processing of the inspection mode as described above until a trigger to end processing, such as a power-off or a termination operation, occurs, it is possible to inspect whether the object 3 has a defect, such as a lack, an erroneous arrangement, or a fault while easing the requirements that the object 3 and the camera 2 be securely fixed and highly accurate alignment be performed for each pixel of image data obtained by capturing the object 3. Although it has been described that the processing of the learning mode and the processing of the inspection mode are repeated, the processing of the learning mode may be performed only once instead of being repeated. Likewise, the processing of the inspection mode may be performed only once instead of being repeated.

As described above, the inspection device 200 included in the inspection system of the second embodiment calculates a parameter representing a feature of data of an object 3 having no defect by performing dimensionality reduction on the data of the object 3 having no defect, performs dimensionality reduction on data of an object 3 to be inspected by using the parameter, generates restored data obtained by restoring the data of the object 3 to be inspected subjected to the dimensionality reduction, and outputs, to the input/output unit 15, a determination result indicating whether the object 3 to be inspected is defective, on the basis of a magnitude of a difference between the data of the object 3 to be inspected and the restored data. Thus, it can inspect whether the object 3 has a defect, such as a lack, an erroneous arrangement, or a fault while easing the requirements that the object 3 and the camera 2 be securely fixed and highly accurate alignment be performed for each pixel of image data obtained by capturing the object 3, compared to the conventional inspection device.

Further, with dimensionality reduction using an autoencoder with a neural network, the inspection device 200 included in the inspection system of the second embodiment can obtain an efficient characteristic obtained by extracting only a parameter commonly appearing in the normal image data sets. In this process, unwanted information, such as variation between the objects 3 of the same type, variation between the image data sets due to the difference between their capture times, or noise of the camera is discarded, which reduces the data size, and allows the storage capacity required by the storage medium 103 to be reduced.

Further, since the inspection device 200 included in the inspection system of the second embodiment learns image data of the object 3 in the normal state from the normal image data sets and performs the inspection, no defective state need be defined by a user, a developer, or the like. Thus, it does not cause a situation where a defect is missed due to incomplete definition of the defective states, and can be applied generally to any defects.

In the inspection device 200 included in the inspection system of the second embodiment, the autoencoder can perform non-linear dimensionality reduction, and thus can obtain a more efficient characteristic than principal component analysis, which is a linear dimensionality reduction method.

In the above inspection system of the second embodiment, the inspection device 200, camera 2, and input/output device 4 are separated from each other. However, either or both of the camera 2 and input/output device 4 may be included in the inspection device 200. Inspection systems configured in this manner can also provide the above advantages of the second embodiment.

In the above inspection system of the second embodiment, the determination unit 14b restores the image data of the object 3 to be inspected subjected to the dimensionality reduction, by the same method as that used for the dimensionality reduction, and outputs, to the input/output unit 15, a determination result indicating whether the object 3 to be inspected is defective, on the basis of a magnitude of a difference between the restored data, which is restored image data, and the image data of the object 3 to be inspected. The determination unit 14b is an example of a unit serving as both a restoring unit and a determination unit. However, a restoring unit that restores the image data of the object 3 to be inspected subjected to the dimensionality reduction by the same method as that used for the dimensionality reduction may be separately provided in the inspection device 200, or the analyzing unit 12b may have the function of the restoring unit. Inspection systems configured in this manner can also provide the above advantages of the second embodiment.

In the above inspection system of the second embodiment, the analyzing unit 12b uses an autoencoder with a neural network in the dimensionality reduction of the object 3, the storage unit 13b stores a result of the autoencoder with the neural network, and the determination unit 14b performs the restoration by using the autoencoder with the neural network. However, when there are different types of objects 3, the dimensionality reduction method may be changed depending on the type of the object 3. For example, it is possible that for an object 3 of a first type, the analyzing unit 12b uses an autoencoder with a neural network in the dimensionality reduction of the object 3 of the first type, the storage unit 13b stores a result of the autoencoder with the neural network, the determination unit 14b performs the restoration by using the autoencoder with the neural network; and for an object 3 of a second type, the analyzing unit 12b uses linear discriminant analysis in the dimensionality reduction of the object 3 of the second type, the storage unit 13b stores a result of the linear discriminant analysis, and the determination unit 14b performs the restoration by using linear discriminant analysis. The number of types of objects 3 is not limited, and the combination of types of objects 3 and dimensionality reduction methods may be arbitrarily determined. However, for objects 3 of the same type, the same dimensionality reduction method is used. Inspection systems configured in this manner can also provide the above advantages of the second embodiment.

In the above inspection system of the second embodiment, the analyzing unit 12b uses an autoencoder with a neural network in dimensionality reduction of the object 3. However, an autoencoder is a simplest method of the dimensionality reduction methods based on neural network, and more complicated methods may be used. Inspection systems configured in this manner can provide, in addition to the above advantages of the second embodiment, the advantage of further improving the performance. Examples of the more complicated methods include methods using a convolutional neural network, a generative adversarial network, or the like. The inspection device 200 according to the second embodiment may use any of the various dimensionality reduction methods, and depending on the used method, the processing method of the autoencoder with the neural network in steps S43 and S44 of FIG. 15, steps S53 and S54 of FIG. 19, and step S60 of FIG. 20 may be changed to a convolutional neural network, a generative adversarial network, or the like.

Third Embodiment

Figure 21:
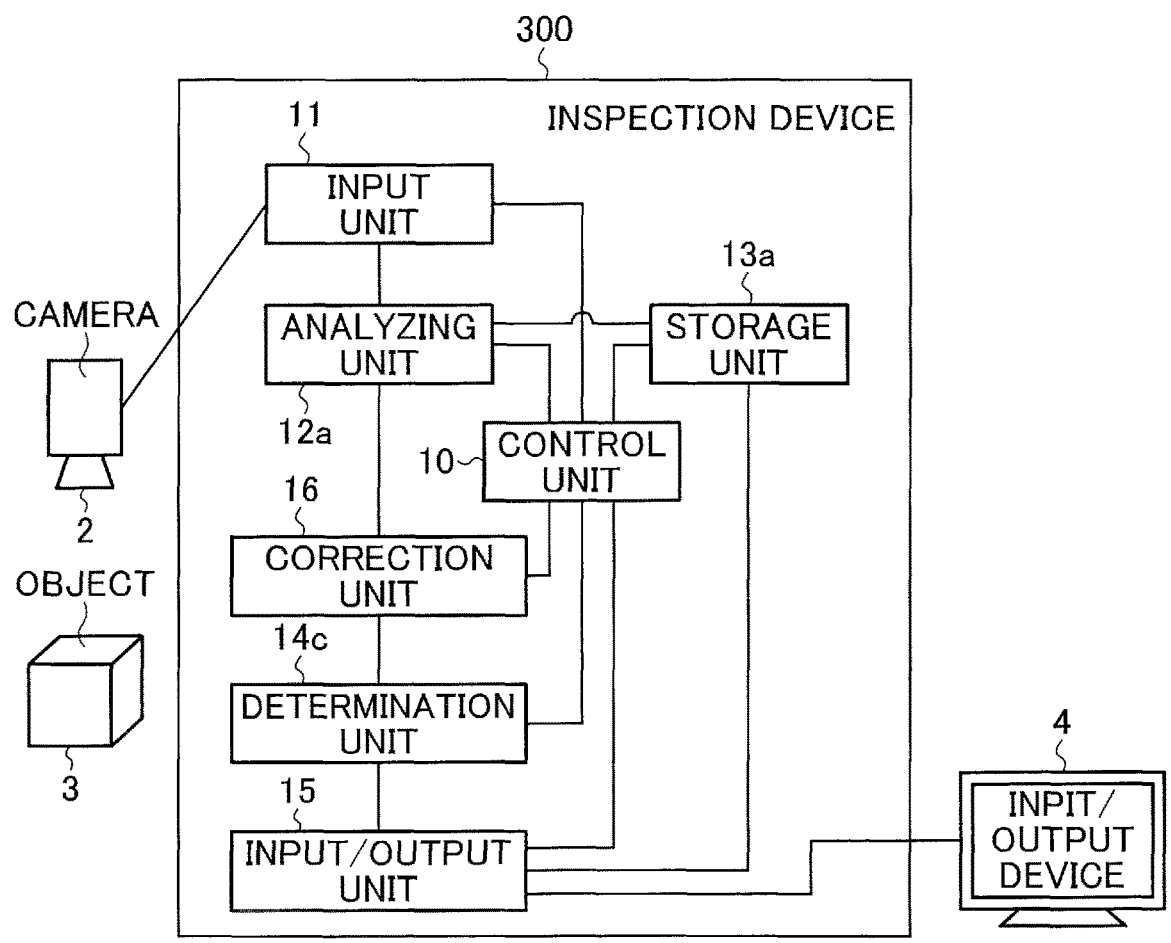
FIG. 21 is a functional block diagram of an inspection system including an inspection device according to a third embodiment of the present invention.
Figure 22:
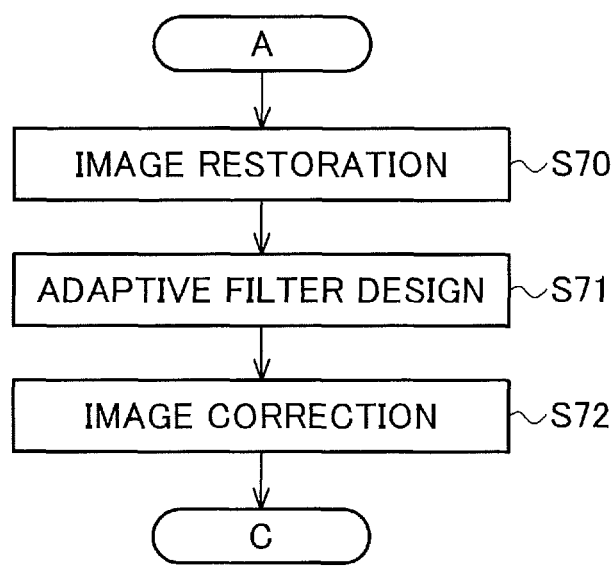
FIG. 22 is a part of a flowchart illustrating an operation in an inspection mode of the inspection device according to the third embodiment of the present invention.
Figure 23:
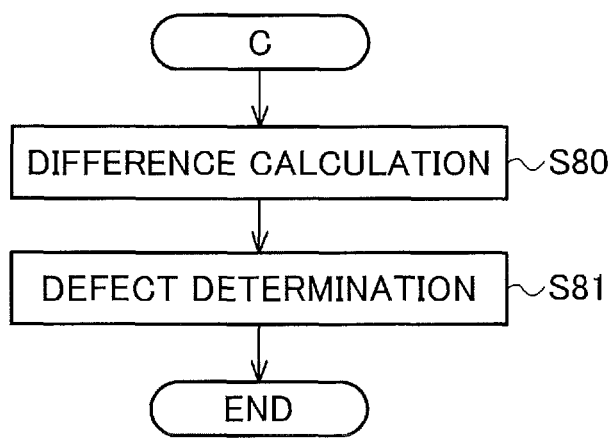
FIG. 23 is another part of the flowchart illustrating the operation in the inspection mode of the inspection device according to the third embodiment of the present invention.

The first embodiment calculates a parameter representing a feature of data of an object 3 having no defect by performing dimensionality reduction on the data of the object 3 having no defect, performs dimensionality reduction on data of an object 3 to be inspected by using the parameter, generates restored data obtained by restoring the data of the object 3 to be inspected subjected to the dimensionality reduction, and outputs, to the input/output unit 15, a determination result indicating whether the object 3 to be inspected is defective, on the basis of a magnitude of a difference between the data of the object 3 to be inspected and the restored data. In the third embodiment, as illustrated in FIGS. 21 to 23, a correction unit (or corrector) 16 that designs a filter to reduce an error between the restored data and the image data to be inspected and filters the restored data by using the designed filter is newly added, and a determination unit 14c is provided instead of the determination unit 14a. Thus, even when a significant error occurs between the restored data and the image data to be inspected due to, for example, insufficiency of normal image data for learning used in the learning mode, or other factors, it is possible to reduce the error between the both in the correction unit 16, thereby improving the accuracy of the subsequent determination by the determination unit 14c. Otherwise, it is the same as the first embodiment.

FIG. 21 is a functional block diagram of an inspection system including an inspection device 300 according to the third embodiment of the present invention. In the following description, already-described elements and operations are given the same reference characters, and the same descriptions thereof are omitted.

In the third embodiment, the determination unit 14c is added instead of the determination unit 14a of FIG. 1 of the first embodiment, and the correction unit 16 is newly added as an element of the functional block diagram.

The correction unit 16 restores the image data set of the object 3 to be inspected subjected to the dimensionality reduction by the same method as that used in the dimensionality reduction, designs a filter to correct an error between the restored data set and the image data set to be inspected, and filters the restored data set by using the designed filter to generate a corrected data set. The corrected data set is the corrected restored data set obtained by filtering the restored data set by using the filter to correct an error between the restored data set and the data set of the object to be inspected. The correction unit 16 is an example of a unit serving as both a restoring unit and a correction unit.

The determination unit 14c outputs, to the input/output unit 15, a determination result indicating whether the object 3 to be inspected is defective, on the basis of a magnitude of a difference between the corrected data set, which is the image data set restored and corrected by the correction unit 16, and the image data set of the object 3 to be inspected. Since the restoration is performed by the correction unit 16, the determination unit 14c does not perform the restoration, unlike the determination unit 14a including the restoring unit. Otherwise, it is the same as the determination unit 14a.

A hardware configuration diagram of the inspection device 300 according to the third embodiment of the present invention is the same as FIG. 2 of the first embodiment. A hardware configuration of the determination unit 14c is the same as that of the determination unit 14a. The correction unit 16 is implemented by the processor 101 reading and executing a program in the storage medium 103 loaded in the memory 102.

A flowchart illustrating an operation in the learning mode of the inspection device 300 according to the third embodiment of the present invention is the same as FIG. 3 of the first embodiment.

A part of a flowchart illustrating an operation in the inspection mode of the inspection device 300 according to the third embodiment of the present invention is the same as FIG. 5 of the first embodiment.

FIG. 22 is another part of the flowchart illustrating the operation in the inspection mode of the inspection device 300 according to the third embodiment of the present invention. A continuation of the operation in the inspection mode of the inspection device 300 will be described below with reference to FIG. 22.

Following the process A subsequent to step S24, after completion of the processing by the analyzing unit 12a, in step S70, the control unit 10 gives a command to start processing to the correction unit 16. In accordance with the command from the control unit 10, the correction unit 16 reads, from the memory 102, a program in the storage medium 103 loaded in the memory 102, and executes it in the processor 101. The correction unit 16 first receives, from the analyzing unit 12a, the vector resulting from the dimensionality reduction of the received image data set to be inspected and the image data set to be inspected, and restores the vector resulting from the dimensionality reduction of the received image data set to be inspected, as an image data set. The method for restoring the image data set is the same as that performed by the determination unit 14a in step S30 of FIG. 6 of the first embodiment.

In step S71, the correction unit 16 designs a filter to reduce an error between the restored data set obtained by the restoration and the image data set to be inspected. Thereby, when a significant error occurs between the restored data set and the image data set to be inspected due to, for example, insufficiency of the normal image data sets for learning used in the learning mode, or other factors, it is possible to reduce the error between the both in the correction unit 16, thereby improving the accuracy of the subsequent determination by the determination unit 14c.

Filters to restore a signal degraded by noise include an inverse filter, a Wiener filter, an adaptive filter, a noise removing filter, and the like. Here, in the third embodiment of the present invention, since the image data set to be inspected, which is an original signal before degradation, is known, it is most effective to use a Wiener filter. A method of designing a Wiener filter will be described below as an example.

Let us consider a spatial filter k to restore an original signal f from a degraded signal g. In the frequency domain, the Fourier transform G of the degraded signal is represented by the product of the Fourier transform F of the original signal and the Fourier transform H of a point spread function. Thus, when the point spread function is known, it is possible, by filtering the degraded signal by using an inverse filter as shown in equation (7), to obtain the Fourier transform F of the original signal as in equation (8).

$$K_{inv} = \frac{1}{H} \tag{7}$$

$$K_{inv}G = \frac{1}{H}FH = F \tag{8}$$

Here, a degradation process with consideration of noise in the frequency domain is represented by equation (9), where N denotes the Fourier transform of the noise.

$$G = FH + N \tag{9}$$

At this time, the filter $K_w$ to minimize an error between the restored data f' and the original data f, which is the original signal and image data to be inspected, is given by equation (10).

$$K_w = \frac{1}{H} \frac{|H|^2}{|H|^2 + |N|^2/|F|^2} \quad (10)$$

The filter $K_w$ represented by equation (10) is referred to as a Wiener filter.

Returning to FIG. 22, in step S72, the correction unit 16 corrects the restored data set by filtering the restored data set by using the filter $K_w$, and then sends the image data set to be inspected and the corrected data set to the determination unit 14c. Here, reference character C indicates the subsequent process, which will be described in detail later.

FIG. 23 is another part of the flowchart illustrating the operation in the inspection mode of the inspection device 300 according to the third embodiment of the present invention. A continuation of the operation in the inspection mode of the inspection device 300 will be described below with reference to FIG. 23.

Following the process C subsequent to step S72, in step S80, the control unit 10 gives a command to start processing to the determination unit 14c. In accordance with the command from the control unit 10, the determination unit 14c reads, from the memory 102, a program in the storage medium 103 loaded in the memory 102, and executes it in the processor 101. The determination unit 14c first receives the image data set to be inspected and the corrected data set from the correction unit 16. The determination unit 14c calculates a difference between the corrected data set and the image data set to be inspected. Otherwise, the determination unit 14c performs the same processing as that performed by the determination unit 14a in step S31 of FIG. 6.

Step S81 is the same as step S32 of the first embodiment. However, the processing is performed by the determination unit 14c instead of the determination unit 14a.

By repeating the processing of the learning mode and the processing of the inspection mode as described above until a trigger to end processing, such as a power-off or a termination operation, occurs, it is possible to inspect whether the object 3 has a defect, such as a lack, an erroneous arrangement, or a fault while easing the requirements that the object 3 and the camera 2 be securely fixed and highly accurate alignment be performed for each pixel of image data obtained by capturing the object 3. Although it has been described that the processing of the learning mode and the processing of the inspection mode are repeated, the processing of the learning mode may be performed only once instead of being repeated. Likewise, the processing of the inspection mode may be performed only once instead of being repeated.

As described above, the inspection device 300 included in the inspection system of the third embodiment calculates a parameter representing a feature of data of an object 3 having no defect by performing dimensionality reduction on the data of the object 3 having no defect, performs dimensionality reduction on data of an object 3 to be inspected by using the parameter, generates restored data obtained by restoring the data of the object 3 to be inspected subjected to the dimensionality reduction, and outputs, to the input/output unit 15, a determination result indicating whether the object 3 to be inspected is defective, on the basis of a magnitude of a difference between the data of the object 3 to be inspected and the restored data. Thus, it can inspect whether the object 3 has a defect, such as a lack, an erroneous arrangement, or a fault while easing the requirements that the object 3 and the camera 2 be securely fixed and highly accurate alignment be performed for each pixel of image data obtained by capturing the object 3, compared to the conventional inspection device.

Further, with dimensionality reduction using principal component analysis, the inspection device 300 included in the inspection system of the third embodiment can obtain an efficient characteristic obtained by extracting only a parameter representing a feature of the data of the object 3 that commonly appears in the normal image data sets. In this process, unwanted information, such as variation between the objects 3 of the same type, variation between the image data sets due to the difference between their capture times, or noise of the camera is discarded, which reduces the data size, and allows the storage capacity required by the storage medium 103 to be reduced.

Further, since the inspection device 300 included in the inspection system of the third embodiment learns image data of the object 3 in the normal state from the normal image data sets and performs the inspection, no defective state need be defined by a user, a developer, or the like. Thus, it does not cause a situation where a defect is missed due to incomplete definition of the defective states, and can be applied generally to any defects.

The inspection device 300 included in the inspection system of the third embodiment is newly provided with a correction unit 16 that designs a filter to reduce an error between the restored data obtained by restoring the image data of the object 3 to be inspected subjected to the dimensionality reduction and the image data to be inspected, and filters the restored data by using the designed filter, and is provided with the determination unit 14c instead of the determination unit 14a. Thus, when a significant error occurs between the restored data and the image data to be inspected due to, for example, insufficiency of normal image data for learning used in the learning mode, or other factors, it is possible to reduce the error between the both in the correction unit 16, thereby improving the accuracy of the subsequent determination by the determination unit 14c.

In the above inspection system of the third embodiment, the inspection device 300, camera 2, and input/output device 4 are separated from each other. However, either or both of the camera 2 and input/output device 4 may be included in the inspection device 300. Inspection systems configured in this manner can also provide the above advantages of the third embodiment.

In the above inspection system of the third embodiment, the correction unit 16 designs a filter to correct an error between the restored data and the image data to be inspected, and filters the restored data by using the designed filter. The correction unit 16 is an example of a unit serving as both a restoring unit and a correction unit. However, a restoring unit that restores the image data of the object 3 to be inspected subjected to the dimensionality reduction by the same method as that used in the dimensionality reduction may be separately provided in the inspection device 300, or the analyzing unit 12a may have the function of the restoring unit. Inspection systems configured in this manner can also provide the above advantages of the third embodiment.

In the above inspection system of the third embodiment, the analyzing unit 12a uses principal component analysis in the dimensionality reduction of the object 3, the storage unit 13a stores a result of the principal component analysis, and the correction unit 16 performs the restoration by using principal component analysis. However, when there are different types of objects 3, the dimensionality reduction method may be changed depending on the type of the object 3. For example, it is possible that for an object 3 of a first type, the analyzing unit 12a uses principal component analysis in the dimensionality reduction of the object 3 of the first type, the storage unit 13a stores a result of the principal component analysis, and the correction unit 16 performs the restoration by using principal component analysis; and for an object 3 of a second type, the analyzing unit 12a uses linear discriminant analysis in the dimensionality reduction of the object 3 of the second type, the storage unit 13a stores a result of the linear discriminant analysis, and the correction unit 16 performs the restoration by using linear discriminant analysis. The number of types of objects 3 is not limited, and the combination of types of objects 3 and dimensionality reduction methods may be arbitrarily determined. However, for objects 3 of the same type, the same dimensionality reduction method is used. Inspection systems configured in this manner can also provide the above advantages of the third embodiment.

In the above inspection system of the third embodiment, the analyzing unit 12a uses principal component analysis for the dimensionality reduction of the object 3. However, it is also possible to use an autoencoder with a neural network or methods, such as a convolutional neural network and a generative adversarial network, that are more complicated than autoencoders with neural networks. Inspection systems configured in this manner can provide, in addition to the above advantages of the third embodiment, the advantage of further improving the performance. The inspection device 300 according to the third embodiment may use any of the various dimensionality reduction methods.

The inspection systems including the inspection devices described in the above embodiments are just examples, and may be combined as appropriate and each embodiment need not be alone.

REFERENCE SIGNS LIST 1, 200, 300 inspection device, 2 camera, 3 object, 4 input/output device, 10 control unit, 11 input unit, 12a, 12b analyzing unit, 13a, 13b storage unit, 14a, 14b, 14c determination unit, 15 input/output unit, 16 correction unit, 100 input/output IF, 101 processor, 102 memory, 103 storage medium, 104 bus.

The invention claimed is:

1. An inspection device comprising:
a memory storing a parameter representing a feature of image data of an object having no defect by performing dimensionality reduction for reducing a dimensionality of data on the image data of the object having no defect; and
processing circuitry configured to
perform dimensionality reduction on image data of an object to be inspected using the parameter stored in memory;
generate restored data obtained by restoring a vector resulting from the dimensionality reduction of the image data of the object to be inspected;
filter the restored data by using a filter for correcting an error between the restored data and the image data of the object to be inspected, thereby generating corrected restored data;
output a determination result indicating whether the object to be inspected is defective, on a basis of a magnitude of a difference of each pixel between the image data of the object to be inspected and the corrected restored data; and
an interface to output the determination result.

2. The inspection device of claim 1, wherein the filter is a Wiener filter.

3. The inspection device of claim 1, wherein when at least one of the differences is not less than a threshold value, the processing circuitry outputs a determination result indicating that the object to be inspected is defective.

4. The inspection device of claim 1, wherein the dimensionality reduction uses principal component analysis.

5. The inspection device of claim 1, wherein the dimensionality reduction uses an autoencoder using a neural network.

6. The inspection device of claim 5, wherein the processing circuitry generates the restored data by using the parameter.

7. The inspection device of claim 3, wherein
the processing circuitry calculates a bounding box that is a rectangle circumscribing a region where the difference is not less than the threshold value and a determination result indicating that the object to be inspected is defective is output; and
the interface outputs, as the determination result, the bounding box.

8. The inspection device of claim 7, wherein the interface performs the output so that a defective portion of the image data of the object to be inspected determined on a basis of the bounding box is indicated by a dotted line superimposed on the image data of the object to be inspected.

9. The inspection device of claim 7, wherein the interface outputs difference composite image data obtained by combining image data of the difference with the image data of the object to be inspected.

10. The inspection device of claim 1, wherein when the processing circuitry outputs a determination result indicating that the object to be inspected is defective, the interface performs the output so that a message for informing that a defect has been detected is displayed.

11. The inspection device of claim 1, further comprising a display to display the determination result output by the interface.

12. An inspection method comprising:
calculating a parameter representing a feature of image data of an object having no defect by performing dimensionality reduction for reducing a dimensionality of data on the image data of the object having no defect, and performing dimensionality reduction on image data of an object to be inspected by using the parameter stored in a storage medium;
generating restored data obtained by restoring a vector resulting from the dimensionality reduction of the image data of the object to be inspected;
filtering the restored data by using a filter for correcting an error between the restored data and the image data of the object to be inspected, thereby generating corrected restored data;
outputting a determination result indicating whether the object to be inspected is defective, on a basis of a magnitude of a difference of each pixel between the image data of the object to be inspected and the corrected restored data; and
outputting the determination result.

* * * * *